United States Patent
Ishizuka et al.

(10) Patent No.: US 7,256,222 B2
(45) Date of Patent: Aug. 14, 2007

(54) RADIATION-CURABLE INK COMPOSITION AND IMAGE RECORDING METHOD

(75) Inventors: Takahiro Ishizuka, Kanagawa (JP); Kazue Sano, Kanagawa (JP); Junichi Yamanouchi, Kanagawa (JP); Keiichi Tateishi, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 10/352,860

(22) Filed: Jan. 29, 2003

(65) Prior Publication Data

US 2004/0010052 A1 Jan. 15, 2004

(30) Foreign Application Priority Data

Jan. 30, 2002 (JP) ............... 2002-022066
Jan. 30, 2002 (JP) ............... P.2002-021651
Jan. 30, 2002 (JP) ............... P.2002-021722

(51) Int. Cl.
*C08F 2/46* (2006.01)

(52) U.S. Cl. .................. 522/75; 522/74; 522/77; 522/78; 522/81; 522/181; 522/909; 106/31.13; 106/31.27; 106/31.43; 106/31.45; 106/31.46; 106/31.47; 106/31.5; 106/31.51; 106/31.52; 347/95; 347/96; 347/100; 523/160

(58) Field of Classification Search .................. 522/74, 522/75, 77, 181, 909, 78, 81; 106/31.13, 106/31.27, 31.43–31.52; 523/160; 347/95, 347/96, 100

See application file for complete search history.

(56) References Cited

U.S. PATENT DOCUMENTS 4,303,924 A 12/1981 Young, Jr.

FOREIGN PATENT DOCUMENTS

| EP | 0 997 508 A1 | 5/2000 |
| JP | 03-258867 A | 11/1991 |
| JP | 09-183927 A | 7/1997 |
| JP | 10-204357 A | 8/1998 |
| JP | 2000-336295 A | 12/2000 |
| WO | WO 02/060994 A1 | 8/2002 |
| WO | WO 02/083795 A2 | 10/2002 |

*Primary Examiner*—Sanza L. McClendon
(74) *Attorney, Agent, or Firm*—Buchanan Ingersoll & Rooney PC

(57) ABSTRACT

To provide a radiation-curable ink composition that can form a high-quality image on not only liquid absorbing materials to be recorded but also non-liquid absorbing materials to be recorded, is superior in curing properties in air, and is superior in storage stability, color tone, light fastness and water resistance of ink, and also to provide an image recording method. The radiation-curable ink composition comprises a monomer having a polymerizable group selected from the group consisting of an acryloyl group, a methacryloyl group, an allyl group, and a vinyl group, an oil-soluble dye, and from 0.005 to 1% by weight of a storage stabilizer, wherein the oil-soluble dye is dissolved in the ink.

19 Claims, No Drawings

RADIATION-CURABLE INK COMPOSITION AND IMAGE RECORDING METHOD

FIELD OF THE INVENTION

The present invention relates to an ink composition containing an oil-soluble dye, which is curable with radiations, and to an image recording method using the ink composition.

BACKGROUND OF THE INVENTION

Aqueous ink compositions involved various defects. That is, in the case where the aqueous ink composition is printed on plain paper, it is inferior in water resistance and is liable to cause blotting (i.e., blurring). Further, in the case where it is printed on a non-water absorbing material to be recorded, such as plastics, since attachment (i.e., adhesion) of ink droplets is poor, an image cannot be formed; since drying of the solvent as used is extremely slow, it is required to dry printed materials immediately after printing without being piled up; and the resulting image is liable to cause blotting.

In order to solve these problems, EP997508A1 discloses inkjet inks that are cured with radiations and fixed. However, since the disclosed inkjet inks use a pigment dispersion as a coloring agent, the transparency is poor, and the color tone is not satisfactory, and hence, it is difficult to obtain photographic images. Further, there was involved a problem such that nozzles are clogged by coagulation of the pigment so that it is difficult to stably eject the ink.

As means for solving this problem, it may be considered to employ a method of using a dye as the coloring agent. However, the dye very likely worsens the radical polymerization properties, and hence, it was difficult to use it for curable inks. U.S. Pat. No. 4,303,924 discloses inks in which a dye not retarding the curing is used. However, this U.S. patent does not definitely describe a guideline of selection of an effective dye. Moreover, according to the conditions illustrated in the U.S. patent, the dye density is low, and the curing conditions under nitrogen, which are free from polymerization retardation by oxygen, are used. In the case where the dye density is increased, or the curing is carried out in air, the curing becomes extremely difficult. Accordingly, for the practical use, there is a large restriction in facilities for providing the conditions under nitrogen.

In addition, the inks as disclosed in the U.S. patent contain conductive salts, and in many cases, these conductive salts are poor in solubility in the ink. Accordingly, there was a possibility that these conductive salts deposit during the storage over a long period of time, resulting in poor printing.

SUMMARY OF THE INVENTION

The present invention is to solve the foregoing various problems of the related art and to achieve the following object. That is, an object of the present invention is to provide an ink composition that can undergo printing with high quality on not only the conventional papers but also non-water absorbing materials to be recorded, such as plastics and metals, is superior in curing properties in air, and is superior in storage stability, color tone, light fastness, and water resistance of ink and to provide an image recording method.

Specifically, in order to achieve the foregoing object, the present invention provides the following means.

(1). A radiation-curable ink composition comprising a monomer having a polymerizable group selected from the group consisting of an acryloyl group, a methacryloyl group, an allyl group, and a vinyl group, an oil-soluble dye, and from 0.005 to 1% by weight of a storage stabilizer, wherein the oil-soluble dye is dissolved in the ink.

(2) The radiation-curable ink composition as set forth in (1) as above, further comprising a photopolymerization initiator.

(3) The radiation-curable ink composition as set forth in (1) or (2) as above, which does not substantially contain water or conductive salts.

(4) The radiation-curable ink composition as set forth in any one of (1) to (3) as above, wherein a content of a dispersion medium other than the monomer, or a solvent is 20% by weight or less.

(5) The radiation-curable ink composition as set forth in any one of (1) to (4) as above, wherein the oil-soluble dye has an oxidation potential is higher than 1.0 V against SCE.

(6) The radiation-curable ink composition as set forth in any one of (1) to (5) as above, wherein the oil-soluble dye is at least one member selected from cyan dyes, magenta dyes, yellow dyes, and black dyes.

(7) The radiation-curable ink composition as set forth in any one of (1) to (6) as above, wherein the oil-soluble dye is at least one member selected from dyes represented by the following general formula (I):

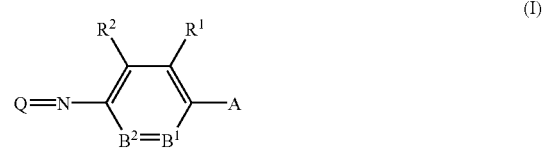

wherein Q represents an atomic group necessary such that the compound represented by the general formula (I) absorbs light in a visible region and/or a near infrared region; A represents —$NR^5R^6$ or a hydroxyl group; $R^5$ and $R^6$ each independently represents a hydrogen atom, an alkyl group, an aryl group, or a heterocyclic group; $B^1$ represents =$C(R^3)$— or =N—; $B^2$ represents —$C(R^4)$= or —N=; $R^1$, $R^2$, $R^3$, and $R^4$ each independently represents a hydrogen atom or a substituent; and $R^1$ and $R^2$, $R^1$ and $R^5$, $R^5$ and $R^6$, $R^3$ and $R^5$, or $R^3$ and $R^4$ may be taken together to form a ring;

dyes represented by the following general formula (A-I):

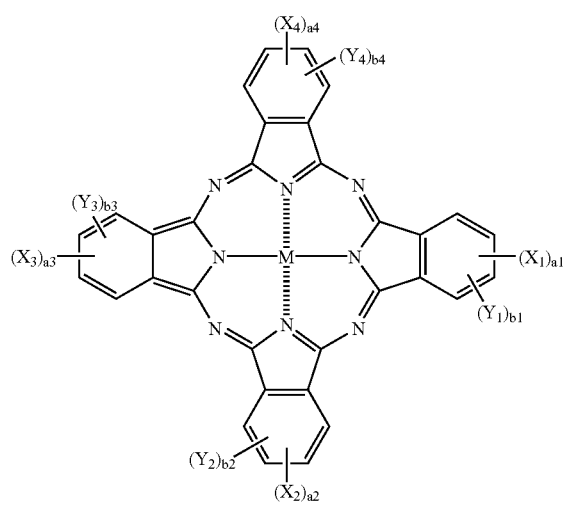

wherein $X_1$, $X_2$, $X_3$, and $X_4$ each independently represents a group selected from —SO-Z, —$SO_2$-Z, —$SO_2NR_1R_2$, —$CONR_1R_2$, —$CO_2R_1$, and a sulfo group; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that $R_1$ and $R_2$ do not represent a hydrogen atom at the same time; M represents a hydrogen atom, a metal element, a metal oxide, a metal hydroxide, or a metal halide; $Y_1$, $Y_2$, $Y_3$, and $Y_4$ each independently represents a hydrogen atom or a monovalent substituent; and $a_1$ to $a_4$ and $b_1$ to $b_4$ represent the numbers of $X_1$ to $X_4$ and $Y_1$ to $Y_4$, respectively and each independently represents an integer of from 0 to 4, provided that the total sum of $a_1$ to $a_4$ is 2 or more and 16 or less; and dyes represented by the following general formula (Y-I):

$$A-N=N-B \tag{Y-I}$$

wherein A and B each independently represents an optionally substituted heterocyclic group.

(8) An ink set of the radiation-curable ink composition as set forth in any one of (1) to (5) as above, comprising three inks of a magenta ink containing the dye represented by the general formula (I), a cyan ink containing the dye represented by the general formula (A-I), and a yellow ink containing the dye represented by the general formula (Y-I).

(9) An image recording method comprising undergoing recording using the radiation-curable ink composition as set forth in any one of (1) to (7) as above and then irradiating with radiations to achieve curing.

(10) The image recording method as set forth in (9) as above, wherein the recording is achieved by any one inkjet mode of charge control mode, pressure pulse mode, and acoustic inkjet mode and then irradiating with radiations to achieve curing.

DESCRIPTION OF THE INVENTION (Ink Composition)

The ink composition according to the present invention is an ink composition that is cured with radiations (radiation-curable ink composition), comprising a: monomer having a polymerizable group, an oil-soluble dye, and a storage stabilizer, wherein the oil-soluble dye is dissolved in the ink. The ink composition may further contain other components to be properly chosen, if desired.

As the radiations for proceeding with the polymerization of the monomer are employable α-rays, γ-rays, X-rays, ultraviolet rays, visible rays, and electron beams. Especially, the use of ultraviolet rays or visible rays is preferable from the standpoints of cost and safety, with the use of ultraviolet rays being particularly preferred.

In the case where ultraviolet rays or visible rays are used as the radiations, a photopolymerization initiator for initiating the polymerization is used in combination. The radiation-curable ink according to other configuration of the present invention contains a photopolymerization initiator for initiating the polymerization of the monomer.

<Monomer>

The monomer that is used in the present invention (hereinafter referred to as "monomer of the present invention") is a compound having a polymerizable double bond (hereinafter referred to as "polymerizable group"), which is solidified by imparting-energies such as ultraviolet rays, heat, and electron-beams. In the monomer, the use of a bifunctional or polyfunctional compound (hereinafter referred to as "polyfunctional monomer") is essential, and a monofunctional compound (hereinafter referred to as "monofunctional monomer") for the viscosity adjustment, the adjustment of crosslinking density, and the control of physical properties (such as strength and adhesion) after curing.

Examples of the polymerizable group include an acryloyl group, a methacryloyl group, an allyl group, a vinyl group, and an internally double bonding group (such as maleic acid). Of these, an acryloyl group and a methacryloyl group are preferred because they can be cured with low energies, with an acryloyl group being particularly preferred.

As the polyfunctional monomer are enumerated vinyl group-containing aromatic compounds; acrylates that are an ester of a dihydric or polyhydric alcohol and acrylic acid or methacrylic acid; acrylamides that are an amide of a dihydric or polyhydric amine and acrylic acid or methacrylic acid; polyester acrylates obtained by introducing acrylic acid or methacrylic acid into an ester obtained by bonding a polybasic acid and a dihydric alcohol or into a polycaprolactone; polyether acrylates obtained by introducing acrylic acid or methacrylic acid into an ether obtained by bonding an alkylene oxide and a polyhydric alcohol; epoxy acrylates obtained by introducing acrylic acid or methacrylic acid into an epoxy resin, or by reacting a dihydric or polyhydric alcohol with an epoxy-containing monomer; urethane acrylates having a urethane bond; amino resin acrylates; acrylic resin acrylates; alkyl resin acrylates; spiran resin acrylates; silicone resin acrylates; reaction products of an unsaturated polyester and the foregoing photopolymerizable monomer; and reaction products of a wax and the foregoing photopolymerizable monomer. Of these are preferable acrylates, polyester acrylates, polyether acrylates, epoxy acrylates, urethane acrylates, acrylic resin acrylates, silicone resin acrylates, and reaction products of an unsaturated polyester and the foregoing photopolymerizable monomer, with acrylates, polyester acrylates, polyether acrylates, epoxy acrylates, and urethane acrylates being particularly preferred.

Examples of the polyfunctional monomer include divinylbenzene; 1,3-butanediol diacrylate; 1,6-hexanediol diacrylate; pentaerythritol triacrylate; trimethylolpropane triacrylate; dipentaerythritol hexaacrylate; 1,6-acryloyl-aminohexane; hydroxypivalic acid ester neopentyl glycol diacrylate; polyester acrylates having a (meth) acryloyl group at the molecular chain terminals of a polyester having a molecular weight of from 500 to 30,000, which comprises a dibasic acid and a dihydric alcohol; polyethylene glycol diacrylate; epoxy acrylates having a molecular weight of from 450 to 30,000, which contain a bisphenol (A, S or F) skeleton (i.e., basic structure); epoxy acrylates having a molecular weight of from 600 to 30,000, which contain a phenolic novolak resin skeleton; reaction products of a polyhydric isocyanate having a molecular weight of from 350 to 30,000 and a hydroxyl group-containing (meth) acrylic acid monomer; and urethane-modified compounds having a urethane bond in the molecule thereof.

As the monofunctional monomer are enumerated substituted or unsubstituted (meth)acrylates; substituted or unsubstituted styrenes; substituted or unsubstituted acrylamides; vinyl group-containing monomers (such as vinyl esters, vinyl ethers, and N-vinylamides); and (meth)acrylic acid. Of these are preferable substituted or unsubstituted (meth) acrylates, substituted or unsubstituted acrylamides, vinyl esters, and vinyl ethers, with substituted or unsubstituted (meth) acrylates and substituted or unsubstituted acrylamides being particularly preferred.

Examples of the monofunctional monomer include hydroxyethyl acrylate, glycidyl acrylate, tetrahydrofurfuryl acrylate, dicyclopentenyl acrylate, 2-acryloyloxyethyl phosphate, allyl acrylate, N,N-dimethylaminoethyl acrylate, N,N-dimethyl acrylamide, N,N-diethylaminopropyl acrylamide, N-butoxymethyl acrylamide, acryloyl morpholine, 2-hydroxyethyl vinyl ether, N-vinylformamide, N-vinylacetamide, 2-cyclohexylcarbamoyloxyethyl acrylate, acrylates containing a polybutyl acrylate site in the ester moiety, and acrylates containing a polydimethylcyclohexane site in the ester moiety.

A content of the monomer of the present invention is preferably in the range of from 50 to 99.6% by weight, more preferably from 70 to 99.0% by weight, and most preferably from 80 to 99.0% by weight in the ink composition. Any of the foregoing monomers can be used in the present invention so far as the effects of the present invention are obtained, but it is more preferable to select the monomer from those having high safety. The monomer having high safety as referred to herein is one having a small value of PII (primary skin irritation index). The monomer preferably has PII of 3.0 or less, more preferably 2.0 or less, further preferably 1.0 or less, and most preferably 0.5 or less.

<Photopolymerization Initiator and Sensitizer>

With respect to the photopolymerization initiator, there are no particular limitations so far as a radical generated by light or other active species is reactive with the polymerizable double bond in the monomer.

As the photopolymerization initiator are generally known acetophenone derivatives, benzophenone derivatives, benzil derivatives, benzoin derivatives, benzoin ether derivatives, benzyl dialkyl ketal derivatives, thioxanthone derivatives, acylphosphine oxide derivatives, metal complexes; p-dialkylaminobenzoic acids, azo compounds, and peroxide compounds. Of these are preferable acetophenone derivatives, benzil derivatives, benzoin ether derivatives, benzyl dialkyl ketal derivatives, thioxanthone derivatives, and acylphosphine oxide derivatives, with acetonephenone derivatives, benzoin ether derivatives, benzyl dialkyl ketal derivatives, and acylphosphine oxide derivatives being particularly preferred.

Examples of the photopolymerization initiator include acetophenone, 2,2-diethoxyacetophenone, p-dimethylaminoacetophenone, p-dimethylaminopropiophenone, benzophenone, p,p'-dichlorobenzophenone, p,p'-bisdiethylaminobenzophenone, Michler's ketone, benzil, benzoin, benzoin methyl ether, benzoin isopropyl ether, benzoin n-propyl ether, benzoin isobutyl ether, benzyl dimethyl ketal, 1-hydroxy-cyclohexyl phenyl ketone, tetramethylthiuram monosulfide, thioxanthone, 2-chlorothioxanthone, 2,4-dimethylthioxanthone, 2,2-dimethylpropioyl diphenylphosphine oxide, 2-methyl-2-ethylhexanoyl diphenylphosphine oxide, 2,6-dimethylbenzoyl diphenylphosphine oxide, 2,6-dimethoxybenzoyl diphenylphosphine oxide, 2,4,6-trimethylbenzoyl diphenylphosphine oxide, bis(2,6-dimethoxybenzoyl)-2,4,4-trimethylpentylphosphine oxide, 2,3,6-trimethylbenzoyl diphenylphosphine oxide, bis(2,3,6-trimethylbenzoyl)-phenylphosphine oxide, 2,4,6-trimethoxybenzoyl diphenylphosphine oxide, 2,4,6-trichlorobenzoyl diphenylphosphine oxide, 2,4,6-trimethylbenzoyl naphthylphosphonate, bis(η5-2,4-cyclopentadien-1-yl)-bis(2,6-di-fluoro-3-(1H-pyrrol-1-yl)-finyl) titanium, p-dimethylaminobenzoic acid, p-diethylaminobenzoic acid, azobisisobutyronitrile, 1,1'-azobis(1-acetoxy-1-phenyethane), benzoin peroxide, and di-t-butyl peroxide.

In addition, the photopolymerization initiators as described on pages 65–148 of Kiyoshi Kato, *Shigaisen Koka Shisutemu* (Ultraviolet Ray-Curing System), by Sogo Gijutsu Center K.K. (1988) can be enumerated as the photopolymerization initiator. The photopolymerization initiator may be used singly or in admixture of two or more thereof. Further, the photopolymerization initiator may be used in combination with a sensitizer.

Further, it is preferred that the photopolymerization initiator does not cause thermal decomposition at temperatures up to 80° C. When an initiator causing thermal decomposition at temperatures of 80° C. or lower is used, a problem in the product preservation arises, and hence, such is not desired.

With respect to the amount of the photopolymerization initiator to be used, there are no particular limitations. However, it is preferably from 0.5 to 20% by weight, more preferably from 1 to 15% by weight, and most preferably from 3 to 10% by weight. When the amount of the photopolymerization initiator to be used is less than 0.5% by weight, the curing does not take place, or the curing time is long. On the other hand, when it exceeds 20% by weight, deposition or separation likely occurs with the lapse of time of dissolution, or the performance of the ink after curing, such as strength and resistance to rubbing, may possibly be worsened, and hence, such is not desired.

The sensitizer is not activated upon irradiation with light when used alone. However, when used in combination with the photopolymerization initiator, the sensitizer gives rise to more effects than those when the photopolymerization initiator is used alone. In general, amines are useful as the sensitizer. The reasons why the addition of an amine accelerates the curing rate reside in that (1) it supplies hydrogen to the photopolymerization initiator by the hydrogen extraction action and that (2) though generated radicals are bound to oxygen molecules in air to worsen the reactivity, the amine is dissolved into the composition to capture oxygen.

As the sensitizer are enumerated amine compounds (such as aliphatic amines, aromatic group-containing amines, piperidine, reaction products of an epoxy resin and an amine, and triethanolamine triacrylate), urea compounds (such as allylthiourea and p-toylthiourea), sulfur compounds (such as sodium diethyl dithiophosphate and soluble salts of aromatic sulfinic acids), nitrile-based compounds (such as N,N-diethyl-p-aminobenzonitrile), phosphorus compounds (such as tri-n-butyl phosphine and sodium diethyl dithiophosphide), nitrogen compounds (such as Michler's ketone, N-nitrisohydroxylamine derivatives, oxazolidine compounds, tetrahydro-1,3-oxazine compounds, and condensates of formaldehyde or acetaldehyde and a diamine), and chlorine compounds (such as carbon tetrachloride and hexachloroethane).

An amount of the sensitizer to be used is from 0 to 10% by weight, preferably from 0.1 to 10% by weight, and more preferably from 0.2 to 5% by weight. The selection and combination of the photopolymerization and the sensitizer and the compounding ratio thereof can be properly chosen depending upon the type of the radiations and monomer to be used and the device to be used.

<Oil-soluble Dye>

As the magenta dye of the oil-soluble dyes that can be used in the present invention, arbitrary magenta dyes can be used. As the magenta dye can be enumerated aryl or heteryl azo dyes having, for example, a phenol, a naphthol, or an aniline as a coupling component; azo methine dyes having, for example, a pyrazolone or a pyrazolotriazole as a coupling component; methine dyes such as arylidene dyes, styryl dyes, merocyanine dyes, and oxonol dyes; carbonium dyes such as diphenylmethane dyes, triphenylmethane dyes, and xanthene dyes; quinone-bsed dyes such as naphthoquinone, anthraquinone, and anthrapyridone; and condensed polycyclic dyes such as dioxazine dyes.

Especially, compounds represented by the general formula (I) (hereinafter referred to as "compound (I)") are preferred.

In the general formula (I), Q represents an atomic group necessary such that the compound represented by the general formula (I) absorbs light in a visible region and/or a near infrared region, and preferably a residue of a diazo component. A represents —NR$^5$R$^6$ or a hydroxyl group, and preferably —NR$^5$R$^6$. R$^5$ and R$^6$ each independently represents a hydrogen atom, an alkyl group, an aryl group, or a heterocyclic group. B$^1$ represents =C(R$^3$)— or =N—; B$^2$ represents —C(R$^4$)= or —N=; R$^1$, R$^2$, R$^3$, and R$^4$ each independently represents a hydrogen atom or a substituent. R$^1$ and R$^2$, R$^1$ and R$^5$, R$^5$ and R$^6$, R$^3$ and R$^5$, or R$^3$ and R$^4$ may be taken together to form a ring.

With respect to the substituent of R$^1$, R$^2$, R$^3$, or R$^4$, there are no particular limitations. But, the examples thereof include a halogen atom, an aliphatic group, an aromatic group, a heterocyclic group, a cyano group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group substituted with an alkyl group, an aryl group or a heterocyclic group, an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl, aryl or heterocyclic thio group, an alkyl- or arylsulfonyl group, a heterocyclic sulfonyl group, an alkyl- or arylsulfinyl group, a heterocyclic sulfinyl group, and a sulfamoyl group. Each of these substituents may further be substituted.

Of the compounds represented by the general formula (I) are preferable those represented by the following general formula (I-1).

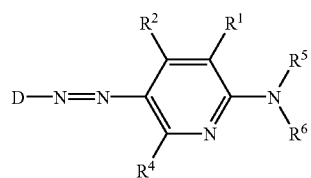

In the general formula (I-1), D represents a 5-membered heterocyclic group. As the hetero atom of the 5-membered heterocyclic group can be enumerated N, O, and S. D is prefereably a nitrogen-containing 5-membered heterocyclic group. The heterocyclic ring may be condensed with an aliphatic ring, an aromatic ring, or other heterocyclic ring.

Preferred examples of the heterocyclic ring of D include a pyrazole ring, an imidazole ring, a thiazole ring, an isothiazole ring, a thiadiazole ring, a benzothiazole ring, a benzoxazole ring, and a benzoisothiazole ring. Each of these heterocyclic rings may further have a substituent. Among them are preferable a pyrazole ring, an imidazole ring, an isothiazole ring, a thiadiazole ring, and a benzothiazole ring represented by the following general formulae (a) to (f).

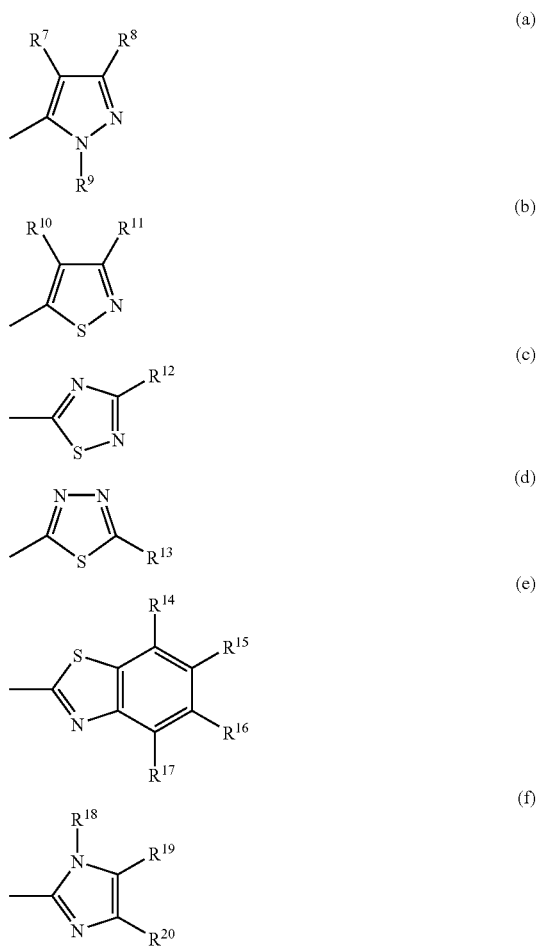

In the general formulae (a) to (f) , R$^7$ to R$^{20}$ each represents a hydrogen atom or a substituent. As the substituent, the same substituents as enumerated above for R$^1$, R$^2$ or R$^4$ can be enumerated.

Among the general formulae (a) to (f), the pyrazole ring and the isothiazole ring represented by the general formulae (a) and (b) are preferred, and the pyrazole ring represented by the general formula (a) is most preferred.

Preferred examples of the substituent represented by R$^1$ or R$^2$ include a hydrogen atom, an alkyl group, an alkoxycarbonyl group, a carbamoyl group, and a cyano group. Each of these groups may further have a substituent.

Preferred examples of the substituent represented by R$^4$ include a hydrogen atom, a halogen atom, an aliphatic group, an aromatic group, a hydroxyl group, an alkoxy group, an aryloxy group, an acyloxy group, a heterocyclic oxy group, an amino group substituted with an alkyl group, an aryl group or a heterocyclic group, an acylamino group, a ureido group, a sulfamoylamino group, an alkoxycarbonylamino group, an aryloxycarbonylamino group, and an alkyl, aryl or heterocyclic thio group, with a hydrogen atom, a halogen atom, an alkyl group, a hydroxyl group, an alkoxy group, an aryloxy group, an acyloxy group, an amino group substituted with an alkyl group, an aryl group or a heterocyclic group, and an acylamino group being more preferred. Especially, a hydrogen atom, an arylamino group, and an amide group are most preferred. Each of these groups may further have a substituent.

Preferably, $R^5$ and $R^6$ each represents a hydrogen atom, an aryl group, or a heterocyclic group. Each of these groups may further have a substituent. However, it is preferred that any one of $R^5$ and $R^6$ does not represent a hydrogen atom.

$R^1$ and $R^5$, or $R^5$ and $R^6$ may be taken together to form a 5- or 6-membered ring.

In the case where the substituent represented by each of D, $R^1$, $R^2$, $R^4$, $R^5$, and $R^6$ further has a substituent, the substituents as enumerated above for $R^1$, $R^2$, and $R^4$ can be enumerated as the substituent.

In the specification and claims of this application, the term "aliphatic group" means an alkyl group, a substituted alkyl group, an alkenyl group, a substituted alkenyl group, an alkynyl group, a substituted alkynyl group, an aralkyl group, and a substituted aralkyl group. The aliphatic group may be branched or cyclic. The aliphatic group preferably has from 1 to 20 carbon atoms, and more preferably from 1 to 16 carbon atoms. As the aryl moiety of the aralkyl group or the substituted aralkyl group, phenyl or naphthyl is preferred, and phenyl is particularly preferred.

Examples of the aliphatic group include methyl, ethyl, butyl, isopropyl, t-butyl, hydroxyethyl, methoxyethyl, cyanoethyl, trifluoromethyl, cyclohexyl, benzyl, 2-phenethyl, vinyl, and allyl.

In the specification and claims of this application, the term "aromatic group" means an aryl group and a substituted aryl group. The aryl group is preferably phenyl or naphthyl, and particularly preferably phenyl. The aromatic group preferably has from 6 to 20 carbon atoms, and more preferably from 6 to 16 carbon atoms.

Examples of the aromatic group include phenyl, p-tolyl, p-methoxyphenyl, and p-chlorophenyl.

The heterocyclic group includes a substituted heterocyclic group and an unsubstituted heterocyclic group. The heterocyclic ring may be condensed with an aliphatic ring, an aromatic ring, or other heterocyclic ring. As the heterocyclic group, a 5- or 6-membered heterocyclic group is preferred. Examples of the substituent include an aliphatic group, a halogen atom, an alkyl- or arylsulfonyl group, an acyl group, an acylamino group, a sulfamoyl group, and a carbamoyl group.

Examples of the heterocyclic group include a 2-pyridyl group, a 2-thienyl group, a 2-thiazolyl group, a 2-benzothiazolyl group, a 2-benzoxazolyl group, and a 2-furyl group.

The alkyl- or arylsulfonyl group includes a substituted alkyl- or arylsulfonyl group and an unsubstituted alkyl- or arylsulfonyl group. Examples of the alkyl- or arylsulfonyl group include a methanesulfonyl group and a phenylsulfonyl group.

The alkyl- or arylsulfinyl group includes a substituted alkyl- or arylsulfinyl group and an unsubstituted alkyl- or arylsulfinyl group. Examples of the alkyl- or arylsulfinyl group include a methanesulfinyl group and a phenylsulfinyl group.

The acyl group includes a substituted acyl group and an unsubstituted acyl group. The acyl group preferably has from 1 to 12 carbon atoms. Examples of the acyl group include an acetyl group and a benzoyl group.

Examples of the halogen atom include a fluorine atom, a chlorine atom, and a bromine atom.

The amino group substituted with an alkyl group, an aryl group or a heterocyclic group include an amino group substituted with one or two groups selected from an alkyl group, an aryl group, and a heterocyclic group. Each of the alkyl group, the aryl group, and the heterocyclic group may further have a substituent. An unsubstituted amino group is not included. As the alkylamino group, an alkyamino group having from 1 to 6 carbon atoms is preferred. Examples of the alkylamino group include a methylamino group and a diethylamino group.

The arylamino group includes a substituted arylamino group and an unsubstituted arylamino group. As the arylamino group, an arylamino group having from 6 to 12 carbon atoms is preferred. Examples of the substituent include a halogen atom.

Examples of the arylamino group include an anilino group and a 2-chloroanilino group.

The alkoxy group includes a substituted alkoxy group and an unsubstituted alkoxy group. As the alkoxy group, an alkoxy group having from 1 to 12 carbon atoms is preferred. Examples of the substituent include an alkoxy group and a hydroxyl group. Examples of the alkoxy group include a methoxy group, an ethoxy group, an isopropoxy group, a methoxyethoxy group, and a hydroxyethoxy group.

The aryloxy group includes a substituted aryloxy group and an unsubstituted aryloxy group. As the aryloxy group, an aryloxy group having from 6 to 12 carbon atoms is preferred. Examples of the substituent include an alkoxy group. Examples of the aryloxy group include a phenoxy group, a p-methoxyphenoxy group, and an o-methoxyphenoxy group.

As the silyloxy group, an aliphatic group- or aromatic group-substituted silyloxy group having from 1 to 12 carbon atoms is preferred. Examples of the silyloxy group include trimethylsilyloxy and diphenylmethylsilyloxy.

The heterocyclic oxy group includes a substituted heterocyclic oxy group and an unsubstituted heterocyclic oxy group. As the heterocyclic oxy group, a heterocyclic oxy group having from 2 to 12 carbon atoms is preferred. Examples of the substituent include an alkyl group and an alkoxy group. Examples of the heterocyclic oxy group include a 3-pyridyloxy group and a 3-thienyloxy group.

The alkoxycarbonyloxy group includes a substituted alkoxycarbonyloxy group and an unsubstituted alkoxycarbonyloxy group. As the alkoxycarbonyloxy group, an alkoxycarbonyloxy group having from 2 to 12 carbon atoms is preferred. Examples of the alkoxycarbonyloxy group include a methoxycarbonyloxy group and an isopropoxycarbonyloxy group.

The aryloxycarbonyloxy group includes a substituted aryloxycarbonyloxy group and an unsubstituted aryloxycarbonyloxy group. As the aryloxycarbonyloxy group, an aryloxycarbonyloxy group having from 7 to 12 carbon atoms is preferred. Examples of the aryloxycarbonyloxy group include a phenoxycarbonyloxy group.

The acylamino group includes a substituted acylamino group and an unsubstituted acylamino group. As the acylamino group, an acylamino group having from 2 to 12 carbon atoms is preferred. Examples of the acylamino group include an acetylamino group, a propionylamino group, a benzoylamino group, and an N-phenylacetylamino group.

The ureido group includes a substituted ureido group and an unsubstituted ureido group. As the ureido group, a ureido group having from 1 to 12 carbon atoms is preferred. Examples of the substituent include an alkyl group and an aryl group. Examples of the ureido group include a 3-methylureido group, a 3,3-dimethylureido group, and a 3-phenylureido group.

The sulfamoylamino group includes a substituted sulfamoylamino group and an unsubstituted sulfamoylamino group. Examples of the substituent include an alkyl group. Examples of the sulfamoylamino group include an N,N-dipropylsulfamoylamino group.

The alkoxycarbonylamino group includes a substituted alkoxycarbonylamino group and an unsubstituted alkoxycarbonylamino group. As the alkoxycarbonylamino group, an alkoxycarbonylamino group having from 2 to 12 carbon atoms is preferred. Examples of the alkoxycarbonylamino group include an ethoxycarbonylamino group.

The alkyl- or arylsulfonylamino group includes a substituted alkyl- or arylsulfonylamino group and an unsubstituted alkyl- or arylsulfonylamino group. As the alkyl- or arylsulfonylamino group, an alkyl- or arylsulfonylamino group having from 1 to 12 carbon atoms is preferred. Examples of the alkyl- or arylsulfonylamino group include a methanesulfonylamino group, an N-phenylmethanesulfonylamino group, and a benzenesulfonylamino group.

The carbamoyl group includes a substituted carbamoyl group and an unsubstituted carbamoyl group. Examples of the substituent include an alkyl group. Examples of the carbamoyl group include a methylcarbamoyl group and a dimethylcarbamoyl group.

The sulfamoyl group includes a substituted sulfamoyl group and an unsubstituted sulfamoyl group. Examples of the substituent include an alkyl group. Examples of the sulfamoyl group include a dimethylsulfamoyl group and a di-(2-hydroxyethyl)sulfamoyl group.

The alkoxycarbonyl group includes a substituted alkoxycarbonyl group and an unsubstituted alkoxycarbonyl group. As the alkoxycarbonyl group, an alkoxycarbonyl group having from 2 to 12 carbon atoms is preferred. Examples of the alkoxycarbonyl group include a methoxycarbonyl group and ethoxycarbonyl group.

The acyloxy group includes a substituted acyloxy group and an unsubstituted acyloxy group. As the acyloxy group, an acyloxy group having from 1 to 12 carbon atoms is preferred. Examples of the acyloxy group include an acetoxy group and a benzoyloxy group.

The carbamoyloxy group includes a substituted carbamoyloxy group and an unsubstituted carbamoyloxy group. Examples of the substituent include an alkyl group. Examples of the carbamoyloxy group include an N-methylcarbamoyloxy group.

The aryloxycarbonyl group includes a substituted aryloxycarbonyl group and an unsubstituted aryloxycarbonyl group. As the aryloxycarbonyl group, an aryloxycarbonyl group having from 7 to 12 carbon atoms is preferred. Examples of the aryloxycarbonyl group include a phenoxycarbonyl group.

The aryloxycarbonylamino group includes a substituted aryloxycarbonylamino group and an unsubstituted aryloxycarbonylamino group. As the aryloxycarbonylamino group, an aryloxycarbonylamino group having from 7 to 12 carbon atoms is preferred. Examples of the aryloxycarbonylamino group include a phenoxycarbonylamino group.

The alkyl-, aryl- or heterocyclic thio group includes a substituted alkyl-, aryl- or heterocyclic thio group and an unsubstituted alkyl-, aryl- or heterocyclic thio group. As the alkyl-, aryl- or heterocyclic thio group, an alkyl-, aryl- or heterocyclic thio group having from 1 to 12 carbon atoms is preferred. Examples of the alkyl-, aryl- or heterocyclic thio group include a methylthio group, a phenylthio group, and a 2-pyridylthio group.

The heterocyclic oxycarbonyl group includes a substituted heterocyclic oxycarbonyl group and an unsubstituted heterocyclic oxycarbonyl group. As the heterocyclic oxycarbonyl group, a heterocyclic oxycarbonyl group having from 2 to 12 carbon atoms is preferred. Examples of the heterocyclic oxycarbonyl group include a 2-pyridyloxycarbonyl group.

The heterocyclic sulfonylamino group includes a substituted heterocyclic sulfonylamino group and an unsubstituted heterocyclic sulfonylamino group. As the heterocyclic sulfonylamino group, a heterocyclic sulfonylamino group having from 1 to 12 carbon atoms is preferred. Examples of the heterocyclic sulfonylamino group include a 2-thiophenesulfonylamino group and a 3-pyridinesulfonylamino group.

The heterocyclic sulfonyl group includes a substituted heterocyclic sulfonyl group and an unsubstituted heterocyclic sulfonyl group. As the heterocyclic sulfonyl group, a heterocyclic sulfonyl group having from 1 to 12 carbon is preferred. Examples of the heterocyclic sulfonyl group include a 2-thiophenesulfonyl group and a 3-pyridinesulfonyl group.

The heterocyclic sulfinyl group includes a substituted heterocyclic sulfinyl group and an unsubstituted heterocyclic sulfonyl group. As the heterocyclic sulfinyl group, a heterocyclic sulfinyl group having from 1 to 12 carbon is preferred. Examples of the heterocyclic sulfinyl group include a 4-pyridinesulfinyl group.

In the present invention, ones represented by the following general formula (I-1a) are a particularly preferred structure.

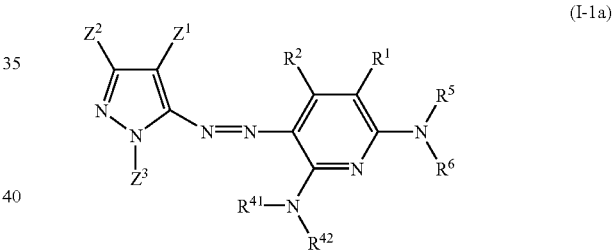

(I-1a)

In the general formula (I-1a), $Z^1$ represents an electron attractive group having a Hammett's substituent constant, σp value of 0.20 or more. $Z^1$ preferably represents an electron attractive group having a σp value of 0.30 or more, more preferably an electron attractive group having a σp value of 0.45 or more, and most preferably an electron attractive group having a σp value of 0.60 or more. However, it is desired that the σp value does not exceed 1.0. As preferred specific examples of the substituent, electron attractive substituents as described later are enumerated. Especially, an acyl group having from 2 to 12 carbon atoms, an alkyloxycarbonyl group having from 2 to 12 carbon atoms, a nitro group, a cyano group, an alkylsulfonyl group having from 1 to 12 carbon atoms, an arylsulfonyl group having from 6 to 18 carbon atoms, a carbamoyl group having from 1 to 12 carbon atoms, and a halogenated alkyl group having from 1 to 12 carbon atoms are preferred. Of these are particularly preferable a cyano group, an alkylsulfonyl group having from 1 to 12 carbon atoms, and an arylsulfonyl group having from 6 to 18 carbon atoms, with a cyano group being most preferred.

$Z^2$ represents a hydrogen atom, an aliphatic group, an aromatic group, or a heterocyclic group.

$Z^3$ represents a hydrogen atom, an aliphatic group, an aromatic group, or a heterocyclic group. Especially, it is preferred that $Z^3$ represents a group comprising a non-metal atomic group necessary for forming a 5- to 8-membered ring.

The 5- to 8-membered ring may be substituted or may be a saturated ring, or may have an unsaturated bond. Among them, an aromatic group and a heterocyclic group are particularly preferred. As the non-metal atom are preferable a nitrogen atom, an oxygen atom, a sulfur atom, and a carbon atom. Specific examples of such ring structures include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzoimidazole ring, an oxazole ring, a benzoxazole ring, a thiazole ring, a benzothiazole ring, an oxane ring, a sulfolane ring, and a thiane ring.

$R^1$, $R^2$, $R^5$, and $R^6$ are synonymous with those in the general formula (I-1).

$R^{41}$ and $R^{42}$ each independently represents a hydrogen atom or a substituent. Examples of the substituent include an aliphatic group, an aromatic group, a heterocyclic group, an acyl group, an alkoxycarbonyl group, an aryloxycarbonyl group, a carbamoyl group, an alkyl- or arylsulfonyl group, and a sulfamoyl group. Of these are preferable a hydrogen atom, an aromatic group, a heterocyclic group, an acyl group, and an alkyl- or arylsulfonyl group, with a hydrogen atom, an aromatic group, and a heterocyclic group being particularly preferred.

Each of the groups described for the general formula (I-1a) may further have a substituent. In the case where each of these groups has a substituent, examples of the substituent include those described for the general formula (I-1) and those enumerated for $R^1$, $R^2$, and $R^4$.

Now, the Hammett's substituent constant, σp value as referred to in the specification and claims of this application will be described. The Hammett's rule is an empirical rule advocated by L. P. Hammett in 1935 in order to quantitatively discuss the influence of substituents on the reaction or equilibrium of benzene derivatives, and propriety of this rule is now widely recognized. The substituent constant required for the Hammett's rule includes a σp value and a σm value. These values can be found in many general books. For example, the details are given in J. A. Dean ed., *Lange's Handbook of Chemistry*, 12th Ed. (1979), by McGraw-Hill; and a special issue of *Kagaku no Ryoiki* (Regions of Chemistry), No. 122, pp. 96–103 (1979), by Nankodo. Needless to say, while in the present invention, each substituent will be limited or described in terms of the Hammett's substituent constant σp value, this does not mean that the present invention is limited only to substituents having known values that can be found from the foregoing books, but the present invention also includes substituents, values of which are unknown but will fall within the intended scope when measured according to the Hammett's rule. Further, though compounds that are not a benzene derivative are included within the scopes of the general formulae (I-1) and (I-1a), the σp values are used as a measure to exhibit the electronic effect of the substituent irrespective of the substitution position. In the present invention, the σp value is used in such meanings.

Examples of the electron attractive group having a Hammett's substituent constant, σp value of 0.60 or more include a cyano group, a nitro group, an alkylsulfonyl group (such as a methanesulfonyl group), and an arylsulfonyl group (such as a benzenesulfonyl group).

Examples of the electron attractive group having a Hammett's substituent constant, σp value of 0.45 or more include not only those as enumerated above but also an acyl group (such as an acetyl group), an alkoxycarbonyl group (such as a dodecyloxycarbonyl group), an aryloxycarbonyl group (such as an m-chlorophenoxycarbonyl group), an alkylsulfinyl group (such as an n-propylsulfinyl group), an arylsulfinyl group (such as a phenylsulfinyl group), a sulfamoyl group (such as an N-ethylsulfamoyl group and an N,N-dimethylsulfamoyl group), and a halogenated alkyl group (such as a trifluoromethyl group).

Examples of the electron attractive group having a Hammett's substituent constant, σp value of 0.30 or more include not only those as enumerated above but also an acyloxy group (such as an acetoxy group), a carbamoyl group (such as an N-ethylcarbamoyl group and an N,N-dibutylcarbamoyl group), a halogenated alkoxy group (such as a trifluoromethyloxy group), a halogenated aryloxy group (such as a pentafluorophenyloxy group), a sulfonyloxy group (such as a methylsulfonyloxy group), a halogenated alkylthio group (such as a difluoromethylthio group), an aryl group substituted with two or more electron attractive groups having a σp value of 0.15 or more (such as a 2,4-dinitrophenyl group and a pentachlorophenyl group), and a heterocyclic group (such as a 2-benzoxazolyl group, a 2-benzothiazolyl group, and a 1-phenyl-2-benzimidazolyl group). Specific examples of the electron attractive group having a σp value of 0.20 or more include not only those as enumerated above but also a halogen atom.

With respect to the particularly preferred combination of substituents as the azo dye represented by the general formula (I-1), $R^1$ and $R^2$ are each preferably a hydrogen atom, a halogen atom, a cyano group, a carbamoyl group, an alkyl group, a hydroxyl group, or an alkoxy group, and more preferably a hydrogen atom, a cyano group, a carbamoyl group, or an alkoxy group.

$R^4$ is preferably a hydrogen atom, a halogen atom, an alkyl group, a hydroxyl group, an amino group, or an amide group, more preferably a hydrogen atom, a halogen atom, an amino group, or an amide group, and most preferably a hydrogen atom, an amino group, or an amide group.

D is preferably a pyrazole ring, an imidazole ring, an isothiazole ring, a thiadiazole ring, or a benzothiazole ring, more preferably a pyrazole ring or an isothiazole ring, and most preferably a pyrazole ring.

$R^5$ and $R^6$ are each preferably a hydrogen atom, an aryl group, or a heterocyclic group. Preferably, $R^5$ and $R^6$ do not represent a hydrogen atom at the same time.

With respect to the preferred combination of substituents represented by the general formula (I-1), compounds in which at least one of the various substituents represents a substituent as enumerated above as the preferred examples are preferable; compounds in which many of the various substituents represent substituents as enumerated above as the preferred examples are more preferable; and compounds in which all of the substituents represent substituents as enumerated above as the preferred examples are most preferable.

Specific examples of the azo dye represented by the general formula (I-1) will be given below, but it should not be construed that the azo dye to be used in the present invention is limited thereto.

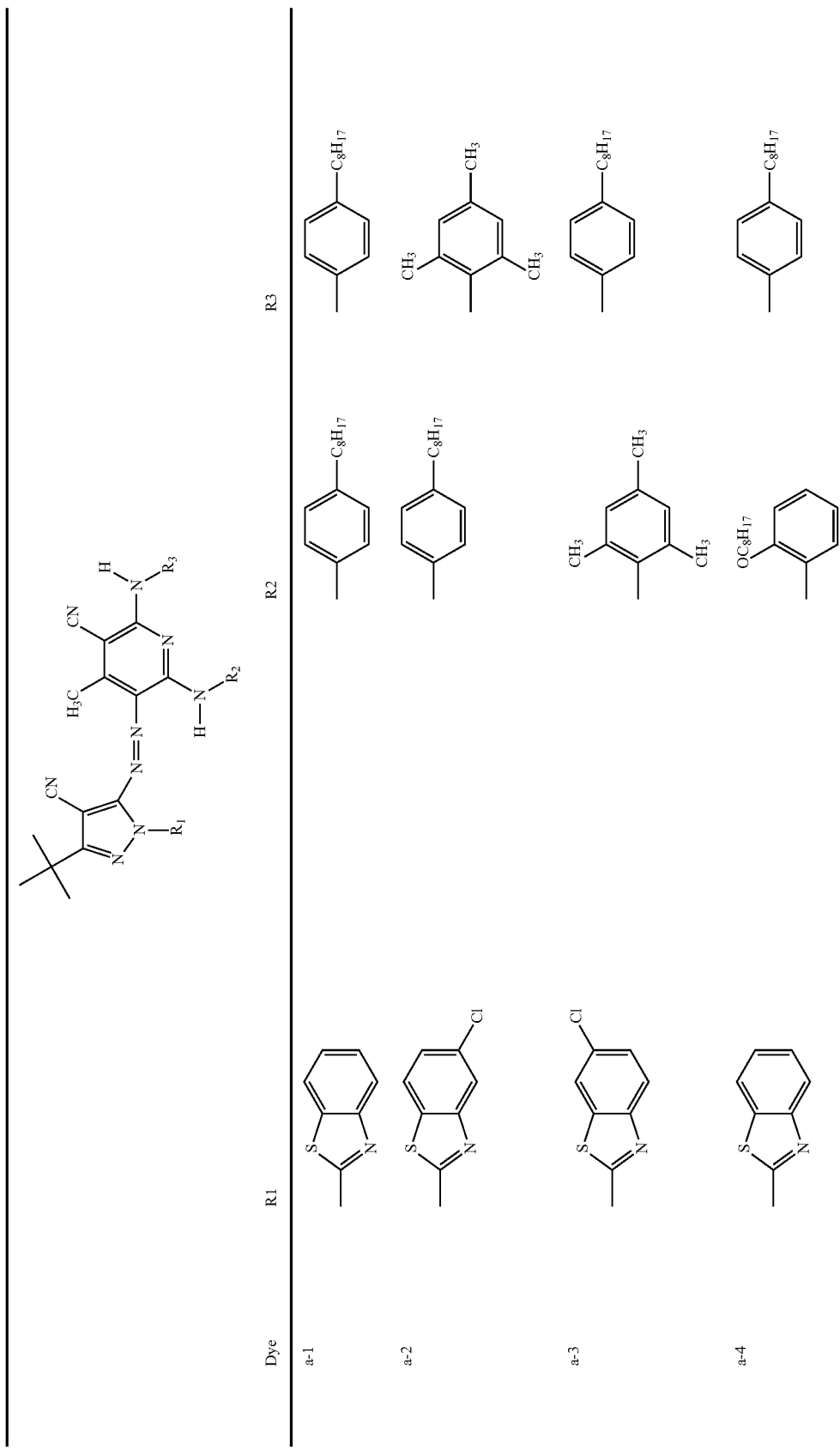

-continued
 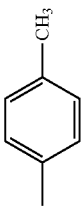 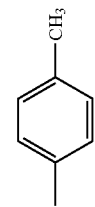 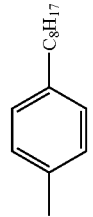 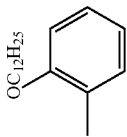
 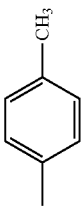 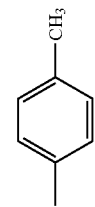 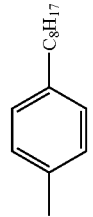 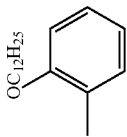
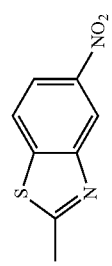 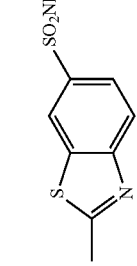 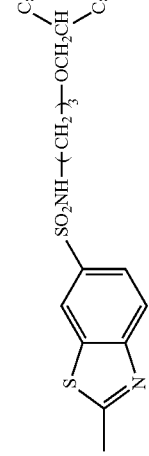 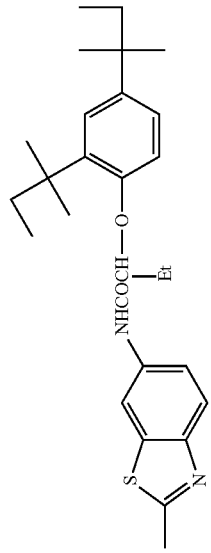 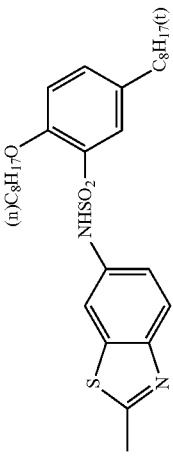 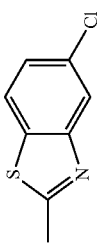
a-5　a-6　a-7　a-8　a-9　a-10

-continued

[Structure: pyrazole-azo-pyridine dye with substituents $R_1$, $R_2$, $R_3$, $R_4$, CN groups, and CH$_3$]

| Dye | $R_1$ | $R_2$ | $R_3$ | $R_4$ |
|---|---|---|---|---|
| a-11 | — | 2-methylbenzothiazol-6-yl with SO$_2$NH-phenyl | 4-methylphenyl (CH$_3$) | 4-methylphenyl-SO$_2$C$_6$H$_{13}$ |
| a-12 | — | 2-methylbenzothiazol-6-yl with SO$_2$-CH$_2$CH$_2$-O-ethyl | 2-methylphenyl-SO$_2$-NH-C$_4$H$_9$ | 2-methylphenyl-SO$_2$-NH-C$_4$H$_9$ |
| a-13 | phenyl | 2-methylbenzothiazol-6-yl with COEt | 4-methylphenyl-SO$_2$CH$_3$ | 3-methylphenyl-COOEt |
| a-14 | 2-chlorophenyl | 2-methylbenzothiazol-6-yl with SO$_2$-NH-C$_4$H$_9$ (4,5-mix) | 4-methylphenyl-SO$_2$-CH$_2$CH$_2$-O-propyl | 3-methylphenyl-COOEt |
| a-15 | 4-methylphenyl-SO$_3$K | 2-methylbenzothiazol-2-yl | 2-methylphenyl-SO$_2$-CH$_2$CH$_2$-O-propyl | 3-methylphenyl-COOC$_4$H$_9$ |

-continued

| Dye | R₁ | R₂ | R₃ | R₄ |
|---|---|---|---|---|
| a-16 | 2-methylbenzothiazol-yl | 2-methylbenzothiazol-yl | 2,4,6-trimethylphenyl | 2,4,6-trimethylphenyl |
| a-17 | 5-chloro-2-methylbenzothiazol-yl | —SO₂CH₃ | 2,4,6-trimethylphenyl | 4-methylphenyl |
| a-18 | 2-methylbenzothiazol-yl | —COCH₃ | C₈H₁₇(t) | C₈H₁₇(t) |

-continued
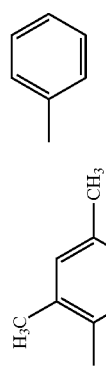 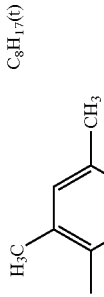 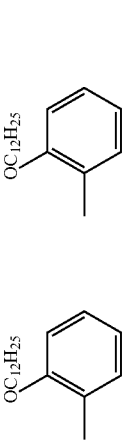

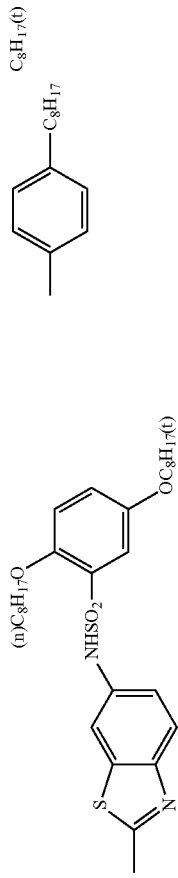
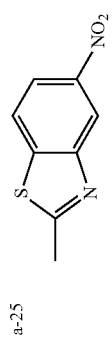
a-25
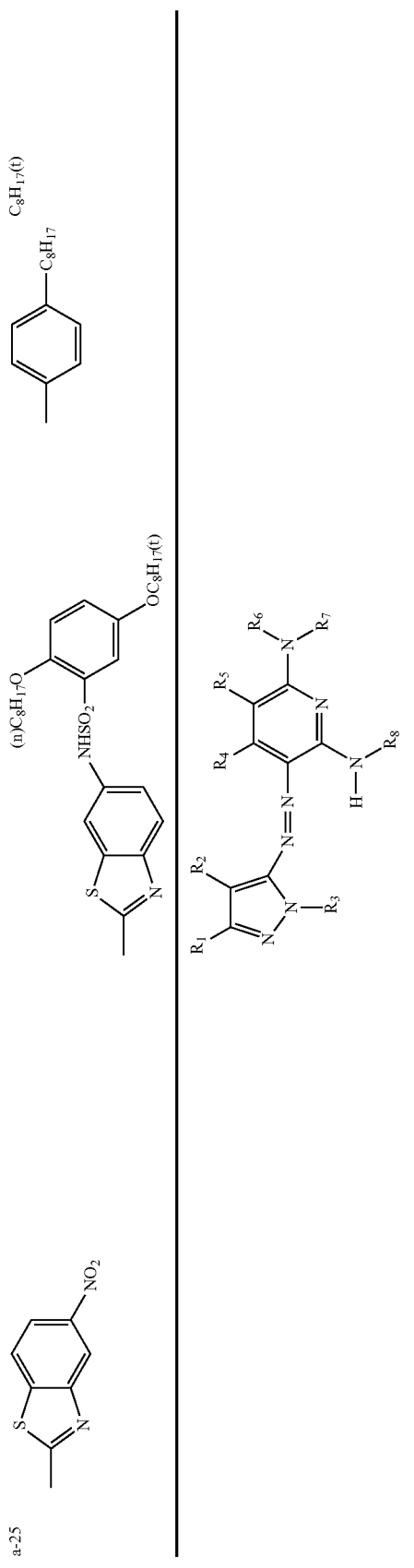
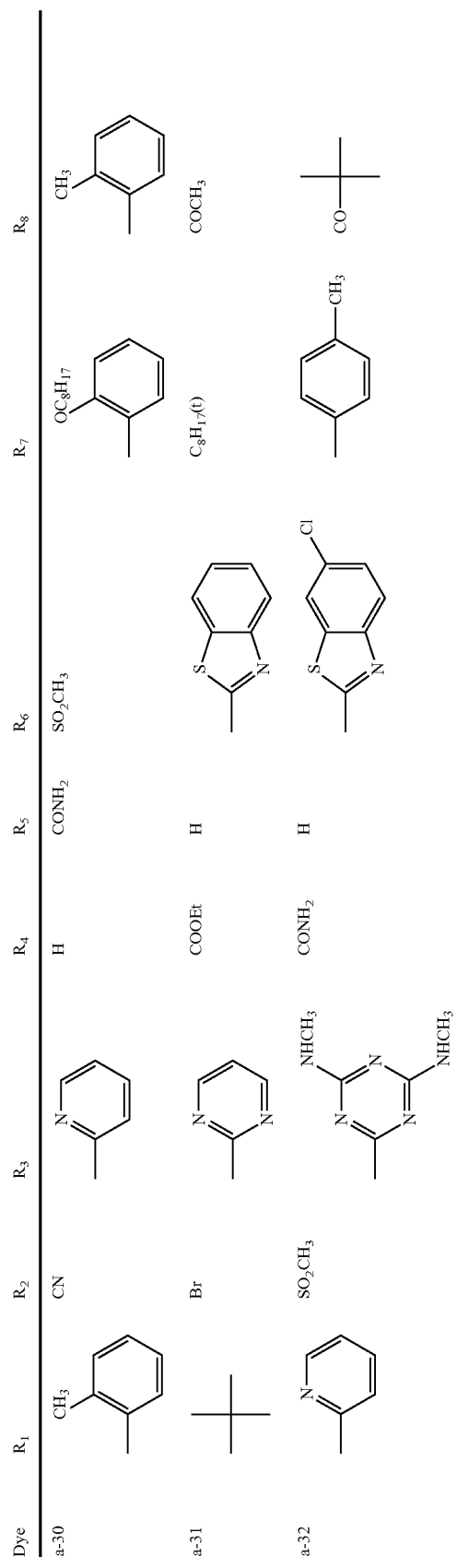
| Dye | R₁ | R₂ | R₃ | R₄ | R₅ | R₆ | R₇ | R₈ |
|---|---|---|---|---|---|---|---|---|
| a-30 | o-tolyl | CN | 2-pyridyl | H | CONH₂ | SO₂CH₃ | o-OC₈H₁₇ phenyl | o-tolyl (CH₃) |
| a-31 | t-Bu | Br | 2-pyridyl | COOEt | H | 2-methylbenzothiazol-5-yl | C₈H₁₇(t) | COCH₃ |
| a-32 | 2-pyridyl | SO₂CH₃ | 4,6-bis(NHCH₃)-triazin-2-yl | CONH₂ | H | 6-chloro-2-methylbenzothiazol-5-yl | p-tolyl | t-Bu-CO |

-continued
| Dye | R₁ | R₂ | R₃ | R₄ | R₅ | R₆ |
|---|---|---|---|---|---|---|
| b-1 | CH₃ | CH₃ | CN | H | 4-C₈H₁₇-C₆H₄ | 4-C₈H₁₇-C₆H₄ |
| b-2 | CH₃ | CH₃ | CN | H | 2,4,6-tri(CH₃)-C₆H₂ | 2,4,6-tri(CH₃)-C₆H₂ |
| b-3 | CH₃ | CH₃ | CONH₂ | H | 4-C₈H₁₇-C₆H₄ | 2,4,6-tri(CH₃)-C₆H₂ |
| b-4 | CH₃ | CH₃ | H | H | 2,4,6-tri(CH₃)-C₆H₂ | 2,4,6-tri(CH₃)-C₆H₂ |
| b-5 | CH₃ | H | CN | H | 4-CH₃-C₆H₄-SO₂NHC₄H₉ | 4-CH₃-C₆H₄-SO₂NHC₄H₉ |
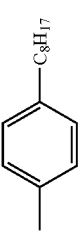

-continued

| | R₁ | R₂ | R₃ | R₄ | (structures) |
|---|---|---|---|---|---|
| b-6 | CH₃ | CH₃ | H | | 2,4,6-trimethylphenyl; 2,4,6-trimethylphenyl; 4-methylphenyl (p-C₈H₁₇); 3,4-disubstituted phenyl with SO₂NHC₄H₉ |
| b-7 | CH₃ | CH₃ | H | | 2-methylbenzothiazol-? ; 2,4,6-trimethylphenyl |
| b-8 | CH₃ | H | H | | 2-methylbenzothiazolyl; SO₂CH₃; 4-methylphenyl-SO₂NHC₄H₉ |

Dye structure:

Pyridine core with substituents R₂, R₃, R₄–N–R₅, and R₆–N–H, with a –N=N– linkage to a 1,2,4-thiadiazole bearing R₁.

| Dye | R₁ | R₂ | R₃ | R₄ | R₅ | R₆ |
|---|---|---|---|---|---|---|
| c-1 | —SCH₃ | CH₃ | CN | H | C₈H₁₇(t) (4-tert-octylphenyl) | 4-methylphenyl-SO₂NHC₄H₉; 4-(C₈H₁₇)phenyl; 4-methylphenyl-SO₂NHC₄H₉ |
| c-2 | phenyl | H | CONH₂ | H | 4-methylphenyl-SO₂NHC₄H₉ | 4-methylphenyl-SO₂NHC₄H₉ |

-continued

| Dye | $R_1$ | $R_2$ | $R_3$ | $R_4$ | $R_5$ | $R_6$ |
|---|---|---|---|---|---|---|
| d-1 | Me | CH$_3$ | CN | H | (2,5-diethyl-mesityl) | (4-SO$_2$NHC$_4$H$_9$-phenyl) |
| d-2 | Me | CH$_3$ | CN | H | (2,5-diethyl-mesityl) | (4-SO$_2$NHC$_4$H$_9$-phenyl) |

-continued

| Dye | $R_1$ | $R_2$ | $R_3$ | $R_4$ | $R_5$ | $R_6$ |
|---|---|---|---|---|---|---|
| d-3 | Me | H | H | | benzothiazole (2-yl) | mesityl (2,4,6-trimethylphenyl) / 2,4,6-trimethylphenyl |
| d-4 | Ph | $CH_3$ | $CONH_2$ | | benzothiazole | 4-$C_8H_{17}$-phenyl / 4-$C_8H_{17}$-phenyl |
| d-5 | Ph | $CH_3$ | H | | benzothiazole-SO$_2$NH-(CH$_2$)$_3$-O-(2,4-di-tert-butylphenyl) | 4-OC$_4$H$_9$(n)-phenyl / 2,6-diethyl-4-methylphenyl |

| Dye | $R_1$ | $R_2$ | $R_3$ | $R_4$ | $R_5$ | $R_6$ |
|---|---|---|---|---|---|---|
| e-1 | 5-Cl | $CH_3$ | $CONH_2$ | H | $C_8H_{17}(t)$-phenyl | $C_8H_{17}(t)$-phenyl |
| e-2 | 5,6-diCl | H | H | H | $C_8H_{17}(t)$-phenyl | 2-methylbenzothiazole |

-continued
| | | | | |
|---|---|---|---|---|
| e-3 | 5,6-diCl | CH₃ | H | 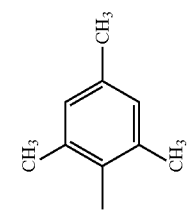 | 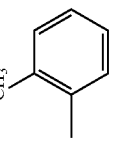 | COCH₃ |
| e-4 | 5-CH₃ | H | CN | H | 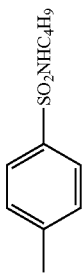 | 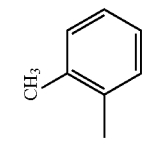 |
| e-5 | 5-NO₂ | CH₃ | H | SO₂CH₃ | 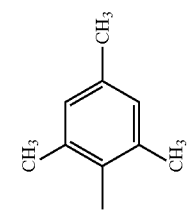 |  |

As the cyan dye of the oil-soluble dyes that can be used in the present invention, arbitrary cyan dyes can be used. As the cyan dye can be enumerated indoaniline dyes; indophenol dyes; azo methine dyes having a pyrrolotriazole as a coupling component; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having, for example, a phenol, a naphthol, or an aniline as a coupling component; indigo dyes; and thioindigo dyes.

Especially, oil-soluble dyes represented by the general formula (A-I) are preferably used.

In the general formula (A-I), $X_1$, $X_2$, $X_3$, and $X_4$ each independently represents a group selected from —SO-Z, —SO$_2$-Z, —SO$_2$NR$_1$R$_2$, —CONR$_1$R$_2$, —CO$_2$R$_1$, and a sulfo group.

Zs' each independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; preferably a substituted or unsubstituted alkyl group, a substituted or unsubstituted aryl group, or a substituted or unsubstituted heterocyclic group; and most preferably a substituted alkyl group, a substituted aryl group, or substituted a heterocyclic group. It is preferred that $X_1$, $X_2$, $X_3$, and $X_4$ each represents —SO$_2$-Z or —SO$_2$NR$_1$R$_2$.

$R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; preferably a hydrogen atom, a substituted or unsubstituted alkyl group, a substituted or unsubstituted aryl group, or a substituted or unsubstituted heterocyclic group; and most preferably a hydrogen atom, a substituted alkyl group, a substituted aryl group, or a substituted heterocyclic group. However, $R_1$ and $R_2$ do not represent a hydrogen atom at the same time.

As specific examples of the substituted or unsubstituted alkyl group, cycloalkyl group, alkenyl group and aryl group are enumerated those as described in the later section (specific examples of substituent).

As the heterocyclic group represented by $R_1$, $R_2$, and Z, a 5- or 6-membered heterocyclic ring is preferred. The heterocyclic ring may be further condensed. Further, the heterocyclic ring may be an aromatic heterocyclic ring or a non-aromatic heterocyclic ring. Specific examples of the heterocyclic group represented by $R_1$, $R_2$, and Z will be given below in terms of the form of a heterocyclic ring while omitting the substitution position or positions, but it should be construed that the substitution position or positions are never limited thereto. For example, in the case of a pyridine, it can be substituted at the 2-position, 3-position or 4-position.

(Specific Examples of Heterocyclic Group)

Pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazoline, and thiazoline.

Of these, aromatic heterocyclic groups are preferred. Specific examples of the aromatic heterocyclic group include pyridine, pyrazine, pyrimidine, pyridazine, triazine, pyrazole, imidazole, benzimidazole, triazole, thiazole, benzothiazole, isothiazole, benzisothiazole, and thiadiazole. Each of these groups may further have a substituent as described later.

$Y_1$, $Y_2$, $Y_3$, and $Y_4$ each independently represents a hydrogen atom or a monovalent substituent. Examples of the monovalent substituent represented by $Y_1$, $Y_2$, $Y_3$, and $Y_4$ include a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group, and a sulfo group. Each of these groups may further have a substituent.

Especially, $Y_1$, $Y_2$, $Y_3$, and Y4 are each preferably a hydrogen atom, a halogen atom, an alkyl group, an aryl group, a cyano group, an alkoxy group, an amide group, a ureid group, a sulfonamide group, a carbamoyl group, a sulfamoyl group, an alkoxycarbonyl group, a carboxyl group, or a sulfo group; more preferably a hydrogen atom, a halogen atom, a cyano group, a carboxyl group, or a sulfo group; and most preferably a hydrogen atom.

When Z, $R_1$, $R_2$, $Y_1$, $Y_2$, $Y_3$, and $Y_4$ each represents a group that can further have a substituent, these groups may have the following substituents.

(Specific Examples of Substituent)

A halogen atom (such as a chlorine atom and a bromine atom); a linear or branched chain alkyl group having from 1 to 12 carbon atoms, an aralkyl group having from 7 to 18 carbon atoms, an alkenyl group having from 2 to 12 carbon atoms, a linear or branched chain alkenyl group having from 2 to 12 carbon atoms, a linear or branched chain alkinyl group having from 2 to 12 carbon atoms, a linear or branched chain cycloalkyl group having from 3 to 12 carbon atoms, and a linear or branched chain cycloalkenyl group having from 3 to 12 carbon atoms (such as methyl, ethyl, propyl, isopropyl, t-butyl, 2-methanesulfonylethyl, 3-phenoxypropyl, trifluoromethyl, and cyclopentyl); an aryl group (such as phenyl, 4-t-butylphenyl, 2,4-di-t-amylphenyl); a heterocyclic group (such as imidazolyl, pyrazolyl, triazolyl, 2-furyl, 2-thienyl, 2-pyrimidinyl, and 2-benzothiazolyl); a cyano group; a hydroxyl group; a nitro group; a carboxy group; an amino group; an alkyloxy group (such as methoxy, ethoxy, 2-methoxyethoxy, and 2-methanesulfonylethoxy); an aryloxy group (such as phenoxy, 2-methylphenoxy, 4-t-butylphenoxy, 3-nitrophenoxy, 3-t-butyloxycarbamoylphenoxy, and 3-methoxycarbamoyl); an acylamino group (such as acetamide, benzamide, and 4-(3-t-butyl-4-hydroxyphenoxy)butanamide); an alkylamino group (such as methylamino, butylamino, diethylamino, and methylbutylamino); an anilino group (such as phenylamino and 2-chloroanilino); a ureido group (such as phenylureido, methylureido, and N,N-dibutylureido); a sulfamoylamino group (such as N,N-dipropylsulfamoylamino); an alkylthio group (such as methylthio, octylthio, and 2-phenoxyethylthio); an arylthio group (such as phenylthio, 2-butoxy-5-t-octylphenylthio, and 2-carboxyphenylthio); an alkyloxycarbonylamino group (such as methoxycarbonylamino); a sulfonamide group (such as methanesulfonamide, benzenesulfonamide, and p-toluenesulfonamide); a carbamoyl group (such as N-ethylcarbamoyl and N,N-dibutylcarbamoyl); a sulfamoyl group (such as N-ethylsulfamoyl, N,N-dipropylsulfamoyl, and N-phenylsulfamoyl); a sulfonyl group (such as methanesulfonyl, octanesulfonyl, benzenesulfonyl, and toluenesulfonyl); an alkyloxycarbonyl group (such as methoxycarbonyl and butyloxycarbonyl); a heterocyclic oxy group (such as 1-phenyltetrazole-5-oxy and 2-tetrahydropyranyloxy); an azo group (such as phenylazo, 4-methoxyphenylazo, 4-pivaroylaminophenylazo, and 2-hydroxy-4-propanoylphenylazo); an acyloxy group (such as acetoxy); a carbamoyloxy group (such as N-methylcarbamoyloxy and N-phenylcarbamoyloxy); a silyloxy group (such as trimethylsilyloxy and dibutylmethylsilyloxy); an aryloxycarbonylamino group (such as phenoxycarbonylamino); an imido group (such as N-succimido and N-phthalimido); a heterocyclic thio group (such as 2-benzothiazolylthio, 2,4-diphenoxy-1,3,5-triazole-6-thio, and 2-pyridylthio); a sulfinyl group (such as 3-phenoxypropylsulfinyl); a phosphonyl group (such as phenoxyphosphonyl, octyloxyphosphonyl, and phenylphosphonyl); an aryloxycarbonyl group (such as phenoxycarbonyl); an acyl group (such as acetyl, 3-phenylpropanoyl, and benzoyl); and an ionic hydrophilic group (such as a carboxyl group, a sulfo group, and a quaternary ammonium group).

$a_1$ to $a_4$ and $b_1$ to $b_4$ represent the numbers of $X_1$ to $X_4$ and $Y_1$ to $Y_4$, respectively and each independently represents an integer of from 0 to 4.

As a matter of course from the previously described definition, $a_1$ and $b_1$ each independently represents an integer of from 0 to 4 while meeting the relationship of $(a_1+b_1)=4$. However, the total sum of $a_1$ to $a_4$ is 2 or more and 16 or less. Especially, a combination in which $a_1$ is 1 or 2, and $b_1$ is 3 or 2 is preferred, with a combination of $a_1=1$ and $b_1=3$ is most preferred.

In each of the combinations of $a_2$ and $b_2$, $a_3$ and $b_3$, and $a_4$ and $b_4$, there is the same relationship as in the case of the combination of $a_1$ and $b_1$, and a preferred combination is also the same.

M represents a hydrogen atom, a metal element, a metal oxide, a metal hydroxide, or a metal halide.

As preferred examples of M are enumerated a hydrogen atom; Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, and Bi as the metal element; VO and GeO as the metal oxide; $Si(OH)_2$, $Cr(OH)_2$, and $Sn(OH)_2$ as the metal hydroxide; and $AlCl$, $SiCl_2$, $VCl$, $VCl_2$, $VOCl$, $FeCl$, $GaCl$, and $ZrCl$ as the metal halide.

Among them, Cu, Ni, Zn, and Al are more preferred, with Cu being most preferred.

Further, Pc (phthalocyanine ring) may form a dimer (such as Pc-M-L-M-Pc) or a trimer via L (divalent connecting group). At that time, Ms' may be the same or different from each other.

As the divalent connecting group represented by L are preferable an oxy group (—O—), a thio group (—S—), a carbonyl group (—CO—), a sulfonyl group (—SO₂—), an imino group (—NH—), and a methylene group (—CH₂—).

As the oil-soluble dye represented by the general formula (A-I) are especially preferable the following combinations.

Particularly preferably, $X_1$ to $X_4$ each independently represents —SO₂-Z or —SO₂NR₁R₂.

Preferably, Zs' each independently represents a substituted or unsubstituted alkyl group, a substituted or unsubstituted aryl group, or a substituted or unsubstituted heterocyclic group, and most preferably a substituted alkyl group, a substituted aryl group, or a substituted heterocyclic group.

Preferably, $R_1$ and $R_2$ each independently represents a hydrogen atom, a substituted or unsubstituted alkyl group, a substituted or unsubstituted aryl group, or a substituted or unsubstituted heterocyclic group, and most preferably a hydrogen atom, a substituted alkyl group, a substituted aryl group, or a substituted heterocyclic group.

Preferably, $Y_1$ to $Y_4$ each independently represents a hydrogen atom, a halogen atom, an alkyl group, an aryl group, a cyano group, an alkoxy group, an amide group, a ureido group, a sulfonamide group, a carbamoyl group, a sulfamoyl group, an alkoxycarbonyl group, a carboxyl group, or a sulfo group, and more preferably a hydrogen atom, a halogen atom, a cyano group, a carboxyl group, or a sulfo group, with the case where all of $Y_1$ to $Y_4$ are a hydrogen atom being most preferred.

Preferably, $a_1$ to $a_4$ each independently represents 1 or 2, and most preferably 1. Preferably, $b_1$ to $b_4$ each independently represents 3 or 2, and most preferably 3.

Preferably, M represents a hydrogen atom, a metal element, a metal oxide, a metal hydroxide, or a metal halide, more preferably Cu, Ni, Zn, or Al, and most preferably Cu.

Preferably, the oil-soluble dye represented by the general formula (A-I) contains an ionic hydrophilic group. More preferably, the oil-soluble dye has at least four ionic hydrophilic groups in one molecule thereof. Especially, it is preferred that the ionic hydrophilic group is a sulfo group. Most preferably, the oil-soluble dye has at least four sulfo groups.

With respect to the preferred combination of groups of the compound represented by the general formula (A-I), compounds in which at least one of the various groups represents a substituent as enumerated above as the preferred examples are preferable; compounds in which many of the various groups represent substituents as enumerated above as the preferred examples are more preferable; and compounds in which all of the groups represent substituents as enumerated above as the preferred examples are most preferable.

Of the oil-soluble dyes represented by the general formula (A-I) is more preferable an oil-soluble dye having a structure represented by the following general formula (A-II). The oil-soluble dye represented by the general formula (A-II) of the present invention will be described below in detail.

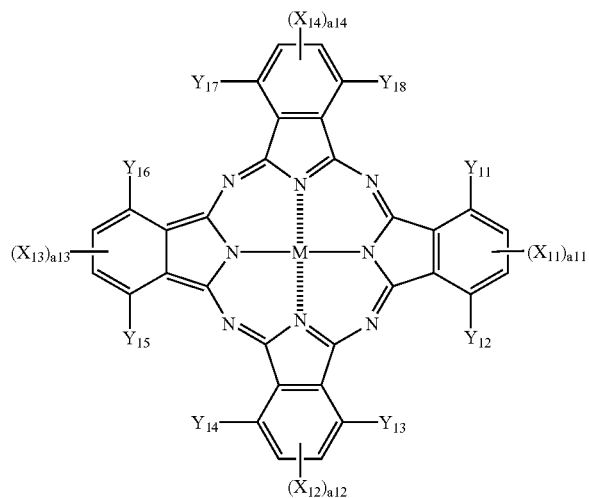

(A-II)

In the general formula (A-II), $X_{11}$ to $X_{14}$ and $Y_{11}$ to $Y_{18}$ are synonymous with $X_1$ to $X_4$ and $Y_1$ to $Y_4$ in the general formula (A-I), and their preferred examples are also the same. Further, M is synonymous with M in the general formula (I), and its preferred examples are also the same.

In the general formula (A-II), $a_{11}$ to $a_{14}$ each independently represents an integer of 1 or 2, and preferably, they meet the relationship of $4 \leq (a_{11}+a_{12}+a_{13}+a_{14}) \leq 6$, with the case of $a_{11}=a_{12}=a_{13}=a_{14}=1$ being most preferred.

As the oil-soluble dye represented by the general formula (A-II) are especially preferable the following combinations.

Particularly preferably, $X_{11}$ to $X_{14}$ each independently represents —$SO_2$-Z or —$SO_2NR_1R_2$.

Preferably, Zs' each independently represents a substituted or unsubstituted alkyl group, a substituted or unsubstituted aryl group, or a substituted or unsubstituted heterocyclic group, and most preferably a substituted alkyl group, a substituted aryl group, or a substituted heterocyclic group.

Preferably, $R_1$ and $R_2$ each independently represents a hydrogen atom, a substituted or unsubstituted alkyl group, a substituted or unsubstituted aryl group, or a substituted or unsubstituted heterocyclic group, and most preferably a hydrogen atom, a substituted alkyl group, a substituted aryl group, or a substituted heterocyclic group. However, $R_1$ and $R_2$ do not represent a hydrogen atom at the same time.

Preferably, $Y_{11}$ to $Y_{18}$ each independently represents a hydrogen atom, a halogen atom, an alkyl group, an aryl group, a cyano group, an alkoxy group, an amide group, a ureido group, a sulfonamide group, a carbamoyl group, a sulfamoyl group, an alkoxycarbonyl group, a carboxyl group, or a sulfo group, more preferably a hydrogen atom, a halogen atom, a cyano group, a carboxyl group, or a sulfo group, and most preferably a hydrogen atom.

Preferably, $a_{11}$ to $a_{14}$ each independently represents 1 or 2, with the case where all of $a_{11}$ to $a_{14}$ are 1 being most preferred.

Preferably, M represents a hydrogen atom, a metal element, a metal oxide, a metal hydroxide, or a metal halide, more preferably Cu, Ni, Zn, or Al, and most preferably Cu.

In the case where the oil-soluble dye represented by the general formula (A-II) contains an ionic hydrophilic group, it is more preferred that the oil-soluble dye has at least four ionic hydrophilic groups in one molecule thereof. Examples of the ionic hydrophilic group as the substituent include a sulfo group, a phosphono group, a carboxyl group, and a quaternary ammonium group. The carboxyl group and the sulfo group may be in the form of a salt, and examples of a counter ion to form the salt include an alkali metal ion (such as a sodium ion and a potassium ion) and an organic cation (such as a tetramethylguanidium ion). Of these are preferable a sulfo group and a carboxyl group. It is most preferred that the ionic hydrophilic group is a sulfo group.

With respect to the preferred combination of groups of the compound represented by the general formula (A-II), compounds in which at least one of the various groups represents a substituent as enumerated above as the preferred examples are preferable; compounds in which many of the various groups represent substituents as enumerated above as the preferred examples are more preferable; and compounds in which all of the groups represent substituents as enumerated above as the preferred examples are most preferable.

It is preferred to introduce at least one of each of electron attractive groups including a sulfinyl group, a sulfonyl group, and a sulfamoyl group into each of the benzene rings of the phthalocyanine such that the total sum of σp values is 1.6 or more.

Specific examples of the oil-soluble dyes represented by the general formulae (A-I) and (A-II) (Illustrative Compounds AI-1 to AI-3 and AII-1 to AII-28) will be given below, but it should not be construed that the oil-soluble cyan dyes that are used in the present invention are limited to these specific examples.

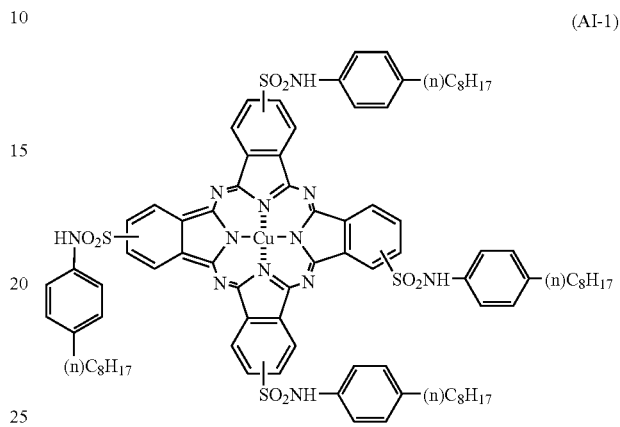

(AI-1)

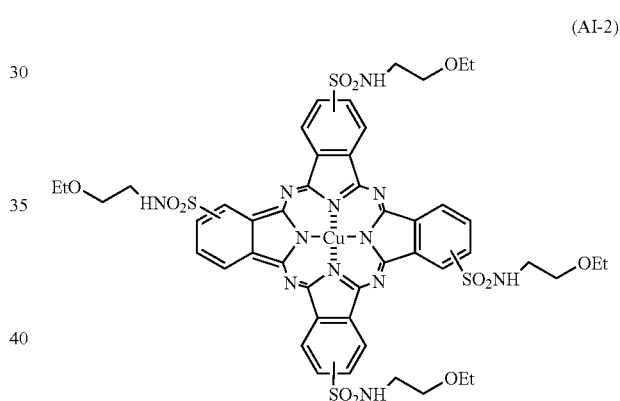

(AI-2)

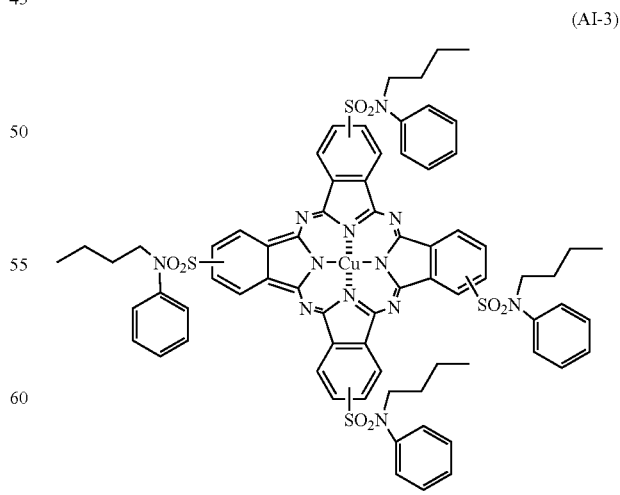

(AI-3)

The following compounds are corresponding to the general formula (A-II).

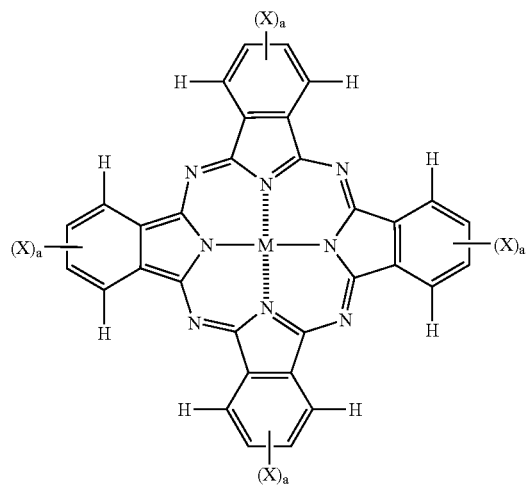
| Compound No. | M | X | a |
|---|---|---|---|
| AII-1 | Cu | —SO$_2$NH—C$_6$H$_4$—C$_8$H$_{17}$(n) | 1 |
| AII-2 | Cu | —SO$_2$NH—C$_6$H$_3$(CO$_2$C$_6$H$_{13}$(n))$_2$ (3,5-) | 1 |
| AII-3 | Cu | —SO$_2$NH—(CH$_2$)$_3$—O—C$_6$H$_3$(t-C$_5$H$_{11}$)$_2$ (2,4-) | 1 |
| AII-4 | Cu | —SO$_2$N(C$_4$H$_9$(n))—C$_6$H$_5$ | 1 |
| AII-5 | Cu | —SO$_2$NH—C$_6$H$_4$—CONH—CH$_2$—CH(C$_2$H$_5$)(C$_4$H$_9$(n)) | 1 |
| AII-6 | Cu | —SO$_2$N(cyclo-C$_6$H$_{11}$)$_2$ | 1 |

-continued

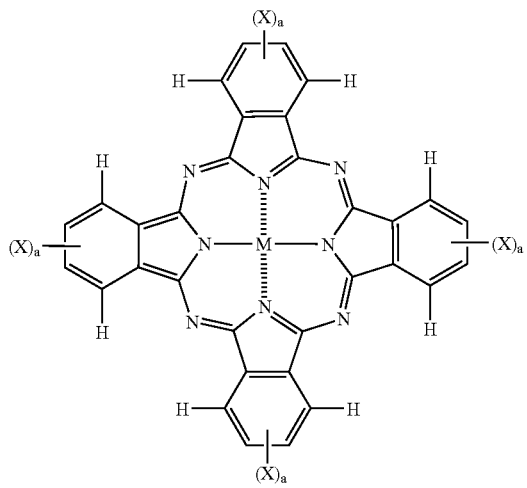

| Compound No. | M | X | a |
|---|---|---|---|
| AII-7 | Cu | —SO$_2$N(CH$_2$CH$_2$OC$_2$H$_5$)(benzothiazol-2-yl) | 1 |
| AII-8 | Cu | —SO$_2$N(CH$_2$CH$_2$OC$_2$H$_5$)$_2$ | 1 |
| AII-9 | Cu | —SO$_2$—(2-OC$_4$H$_9$-4-(t)C$_8$H$_{17}$-phenyl) | 1 |
| AII-10 | Cu | —SO$_2$—(4-C$_{12}$H$_{25}$-phenyl) | 1 |
| AII-11 | Cu | —SO$_2$—CH$_2$CO$_2$C$_2$H$_5$ | 1 |
| AII-12 | Cu | —SO$_2$—CH$_2$CH$_2$NH—C(O)—CH(C$_2$H$_5$)(C$_4$H$_9$) | 1 |
| AII-13 | Cu | —SO$_2$—CH$_2$CH$_2$CO$_2$C$_6$H$_{13}$(n) | 1 |
| AII-14 | Cu | —SO$_2$—C$_4$H$_9$(n) | 2 |
| AII-15 | Cu | —SO$_2$—(4-C$_4$H$_9$(t)-phenyl) | 1 |
| AII-16 | Cu | —SO$_2$—C$_6$H$_{11}$ (cyclohexyl) | 1 |
| AII-17 | Cu | —SO$_2$—(CH$_2$)$_3$—SO$_2$NH—(CH$_2$)$_3$—O—CH(CH$_3$)$_2$ | 1 |

-continued

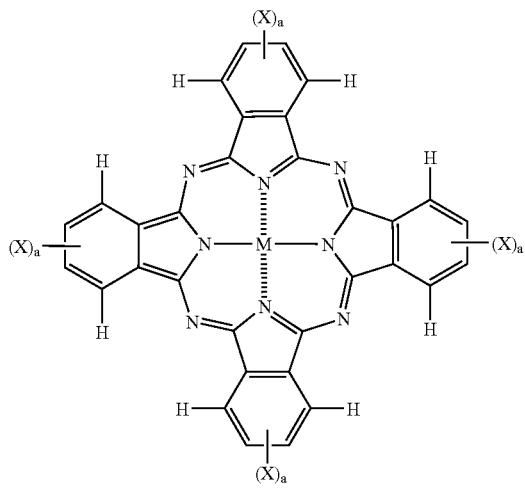

| Compound No. | M | X | a |
|---|---|---|---|
| AII-18 | Cu | —SO₂─(CH₂)₃─CO—O—CH(CH₃)—CH₂—CH₃  (—SO₂(CH₂)₃C(=O)O—CH(CH₃)CH₂CH₃) | 1 |
| AII-19 | Cu | —SO₂─(CH₂)₃─C(=O)O—CH(CH₃)—CH₂OCH₃ | 1 |
| AII-20 | Cu | —SO₂—CH₂C(=O)O—CH₂CH(C₂H₅)—C₄H₉ | 1 |
| AII-21 | Cu | —SO₂NH─(CH₂)₃─N[—C₃H₇OC(=O)—C₆H₄—SO₃⁻·N⁺H(C₆H₁₃)₃]₃ | 1 |
| AII-22 | Cu | —SO₂—CH₂CH₂NHC(=O)NH—C₆H₁₁ (cyclohexyl) | 1 |
| AII-23 | Cu | —SO₂─(CH₂)₃─OC(=O)NH—C₆H₅ | 1 |

In the table, specific examples of each of combinations of ($Y_{11}$, $Y_{12}$), ($Y_{13}$, $Y_{14}$), ($Y_{15}$, $Y_{16}$) and ($Y_{17}$, $Y_{18}$) are independently not in order.

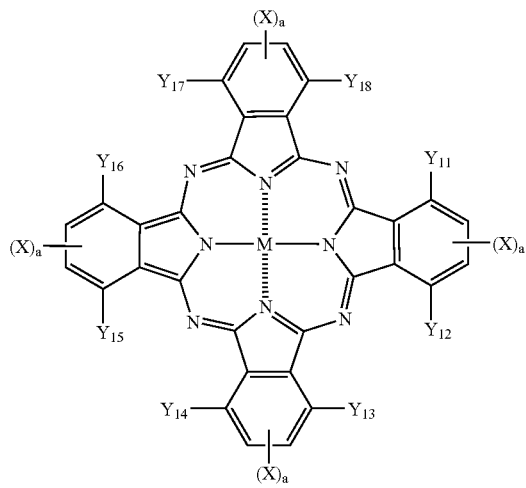

| Compound No. | M | X | $Y_{11}, Y_{12}$ | $Y_{13}, Y_{14}$ | $Y_{15}, Y_{16}$ | $Y_{17}, Y_{18}$ | a |
|---|---|---|---|---|---|---|---|
| AII-24 | Cu | —SO$_2$NH—⟨phenyl⟩—NHSO$_2$—⟨phenyl⟩—IC$_4$H$_9$ | H, Cl | H, Cl | H, Cl | H, Cl | 1 |
| AII-25 | Cu | —SO$_2$N(CH$_2$CH$_2$O—Bu)$_2$ | H, Cl | H, Cl | H, Cl | H, Cl | 1 |
| AII-26 | Cu | —SO$_2$NH—CH(C$_2$H$_5$)C$_4$H$_9$ | H, Cl | H, Cl | H, Cl | H, Cl | 1 |
| AII-27 | Cu | —SO$_2$—⟨phenyl⟩—O—C$_5$H$_{11}$ | Cl, Cl | Cl, Cl | Cl, Cl | Cl, Cl | 1 |
| AII-28 | Cu | —SO$_2$—⟨phenyl⟩—CO$_2$—CH(C$_2$H$_5$)C$_4$H$_9$ | H, Cl | H, Cl | H, Cl | H, Cl | 1 |

As the yellow dye of the oil-soluble dyes that can be used in the present invention, arbitrary yellow dyes can be used. As the yellow dye can be enumerated aryl or heteryl azo dyes having, for example, a phenol, a naphthol, an aniline, a pyrazolone, a pyridone, or an open chain type active methylene compound as a coupling component; azo methine dyes having, for example, an open chain type active methylene compound as a coupling component; methine dyes such as benzylidene dyes and monomethine oxonol dyes; and quinone-bsed dyes such as naphthoquinone dyes and anthraquinone dyes. As other dye species can be enumerated quinophthalone dyes, nitro-nitroso dyes, acridine dyes, and acridinone dyes.

Especially, it is preferred to use an oil-soluble dye represented by the general formula (Y-I). In the general formula (Y-I), A and B each independently represents an optionally substituted heterocyclic group. As the heterocyclic ring, a heterocyclic ring constituted of a 5-membered ring or a 6-membered ring is preferred. The heterocyclic ring may be of a monocyclic structure or a polycyclic structure in which two or more rings are condensed, and may be an aromatic heterocyclic ring or a non-aromatic heterocyclic ring. As the hetero atom constituting the heterocyclic ring are preferable a nitrogen atom, an oxygen atom, and a sulfur atom.

As the heterocyclic ring represented by A are preferable 5-pyrazolone, pyrazole, oxazolone, isoxazolone, barbituric acid, pyridone, rhodanine, pyrazolidinedione, pyrazolopyridone, Meldrum's acid, and condensed heterocyclic rings of the foregoing heterocyclic rings with a hydrocarbon aromatic ring or a heterocyclic ring. Of these are more preferable 5-pyrazolone, 5-aminopyrazole, pyridone, and pyrazoloazole, with 5-aminopyrazole, 2-hydroxy-6-pyridone, and pyrazolotriazole being particularly preferred.

As the heterocyclic ring represented by B are suitable pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole imidazole, benzimidazole, triazole, oxazole, isoxazole, benzoxazole, thiazole, benzothiazole, isothiazole, benzoisothiazole, thiadiazole, benzoisoxazole, pyrrolidine, piperidine, piperazine, imidazoline, and thiazoline. Of these, pyridine, quinoline, thiophene, benzothiophene, pyrazole, imidazole, benzimidazole, triazole, oxazole, isoxazole, benzoxazole, thiazole, benzothiazole, isothiazole, benzoisothiazole, thiadiazole, and benzoisoxazole are preferable; quinoline, thiophene, pyrazole, thiazole, benzoxazole, benzoisoxazole, isothiazole, imidazole, benzothiazole, and thiadiazole are more preferable; and pyrazole, benzothiazole, benzoxazole, imidazole, 1,2,4-thiadiazole, and 1,3,4-thiadiazole are most preferable.

Examples of the substituent that is substituted on A and B include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, an alkyl- or arylsulfinyl group, an alkyl- or arylsufonyl group, an acyl group, an aryloxycarbonyl group, an alkoxycarbonyl group, a carbamoyl group, an imido group, a phosphino group, a phosphinyl group, a phosphinyloxy group, a phosphinylamino group, and a silyl group.

Among the dyes represented by the general formula (Y-I) are more preferable dyes represented by the following general formulae (Y-II), (Y-III) and (Y-IV).

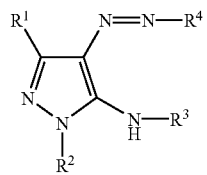

(Y-II)

In the general formula (Y-II), $R^1$ and $R^3$ each represents a hydrogen atom, a cyano group, an alkyl group, a cycloalkyl group, an aralkyl group, an alkoxy group, an alkylthio group, an arylthio group, an aryl group, or an ionic hydrophilic group; $R^2$ represents a hydrogen atom, an alkyl group, a cycloalkyl group, an aralkyl group, a carbamoyl group, an acyl group, an aryl group, or a heterocyclic group; and $R^4$ represents a heterocyclic group.

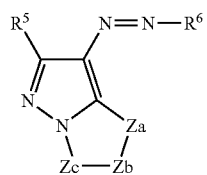

(Y-III)

In the general formula (Y-III), $R^5$ represents a hydrogen atom, a cyano group, an alkyl group, a cycloalkyl group, an aralkyl group, an alkoxy group, an alkylthio group, an arylthio group, an aryl group, or an ionic hydrophilic group; Za represents —N=, —NH—, or $C(R^{11})$=; Za and Zc each independently represents —N= or $C(R^{11})$=; $R^{11}$ represents a hydrogen atom or a non-metallic substituent; and $R^6$ represents a heterocyclic group.

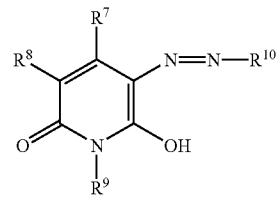

(Y-IV)

In the general formula (Y-IV), $R^7$ and $R^9$ each represents a hydrogen atom, a cyano group, an alkyl group, a cycloalkyl group, an aralkyl group, an aryl group, an alkylthio group, an arylthio group, an alkoxycarbonyl group, a carbamoyl group, or an ionic hydrophilic group; $R^8$ represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group, or an ionic hydrophilic group; and $R^{10}$ represents a heterocyclic group.

In the general formula (Y-II), $R^1$ and $R^3$ each represents a hydrogen atom, a cyano group, an alkyl group, a cycloalkyl group, an aralkyl group, an alkoxy group, an alkylthio group, an arylthio group, an aryl group, or an ionic hydrophilic group; $R^2$ represents a hydrogen atom, an alkyl group, a cycloalkyl group, an aralkyl group, a carbamoyl group, an acyl group, an aryl group, or a heterocyclic group; and $R^4$ represents a heterocyclic group.

In the general formula (Y-III), $R^5$ represents a hydrogen atom, a cyano group, an alkyl group, a cycloalkyl group, an aralkyl group, an alkoxy group, an alkylthio group, an arylthio group, an aryl group, or an ionic hydrophilic group; Za represents —N=, —NH—, or $C(R^{11})$=; Za and Zc each independently represents —N= or $C(R^{11})$=; $R^{11}$ represents a hydrogen atom or a non-metallic substituent; and $R^6$ represents a heterocyclic group.

In the general formula (Y-IV), $R^7$ and $R^9$ each represents a hydrogen atom, a cyano group, an alkyl group, a cycloalkyl group, an aralkyl group, an aryl group, an alkylthio group, an arylthio group, an alkoxycarbonyl group, a carbamoyl group, or an ionic hydrophilic group; $R^8$ represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group, or an ionic hydrophilic group; and $R^{10}$ represents a heterocyclic group.

The substituents represented by $R^1$, $R^2$, $R^3$, $R^5$, $R^7$, $R^8$, and $R^9$ in the general formulae (Y-II), (Y-III) and (Y-IV) will be described below in detail.

The alkyl group represented by $R^1$, $R^2$, $R^3$, $R^5$, $R^7$, $R^8$, and $R^9$ includes a substituted alkyl group and an unsubstituted alkyl group.

As the alkyl group is preferable an alkyl group having from 1 to 20 carbon atoms. Examples of the substituent include a hydroxyl group, an alkoxy group, a cyano group, a halogen atom, and an ionic hydrophilic group.

Suitable examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group represented by $R^1$, $R^2$, $R^3$, $R^5$, $R^7$, $R^8$, and $R^9$ includes a substituted cycloalkyl group and an unsubstituted cycloalkyl group.

As the cycloalkyl group is preferable a cycloalkyl group having from 5 to 12 carbon atoms. Examples of the substituent include an ionic hydrophilic group.

Suitable examples of the cycloalkyl group include cyclohexyl.

The aralkyl group represented by $R^1$, $R^2$, $R^3$, $R^5$, $R^7$, $R^8$, and $R^9$ includes a substituted aralkyl group and an unsubstituted aralkyl group.

As the aralkyl group is preferable an aralkyl group having from 7 to 20 carbon atoms. Examples of the substituent include an ionic hydrophilic group.

Suitable examples of the aralkyl group include benzyl and 2-phenethyl.

The aryl group represented by $R^1$, $R^2$, $R^3$, $R^5$, $R^7$, $R^8$, and $R^9$ includes a substituted aryl group and an unsubstituted aryl group.

As the aryl group is preferable an aryl group having from 6 to 20 carbon atoms. Examples of the substituent include an alkyl group, an alkoxy group, a halogen atom, an alkylamino group, and an ionic hydrophilic group.

Suitable examples of the aryl group include phenyl, p-tolyl, p-methoxyphenyl, o-chlorophenyl, and m-(3-sulfopropylamino)phenyl.

The alkylthio group represented by $R^1$, $R^2$, $R^3$, $R^5$, $R^7$, $R^8$, and $R^9$ includes a substituted alkylthio group and an unsubstituted alkylthio group.

As the alkylthio group is preferable an alkylthio group having from 1 to 20 carbon atoms. Examples of the substituent include an ionic hydrophilic group.

Suitable examples of the alkylthio group include methylthio and ethylthio.

The arylthio group represented by $R^1$, $R^2$, $R^3$, $R^5$, $R^7$, $R^8$, and $R^9$ includes a substituted arylthio group and an unsubstituted arylthio group.

As the arylthio group is preferable an arylthio group having from 6 to 20 carbon atoms. Examples of the substituent include an alkyl group and an ionic hydrophilic group.

Suitable examples of the arylthio group include phenylthio and p-tolylthio.

As the heterocyclic group represented by $R^2$ is preferable a 5-membered or 6-membered heterocyclic ring. The heterocyclic ring may further be condensed. As the hetero atom constituting the heterocyclic ring are preferable a nitrogen atom, a sulfur atom, and an oxygen atom. Further, the heterocyclic ring may be an aromatic heterocyclic ring or a non-aromatic heterocyclic ring. The heterocyclic ring may further be substituted. Examples of the substituent are suitably the same substituents enumerated later for the aryl group. As the heterocyclic ring are enumerated 6-membered nitrogen-containing aromatic heterocyclic rings, with triazine, pyrimidine, and phthalazine being particularly preferred.

As the halogen atom represented by $R^8$ are suitably enumerated a fluorine atom, a chlorine atom, and a bromine atom.

The alkoxy group represented by $R^1$, $R^3$, $R^5$, and $R^8$ includes a substituted alkoxy group and an unsubstituted alkoxy group.

As the alkoxy group is preferable an alkoxy group having from 1 to 20 carbon atoms. Examples of the substituent include a hydroxyl group and an ionic hydrophilic group.

Suitable examples of the alkoxy group include methoxy, ethoxy, isopropoxy, methoxyethoxy, hydroxyethoxy, and 3-carboxypropoxy.

The aryloxy group represented by $R^8$ includes a substituted aryloxy group and an unsubstituted aryloxy group.

As the aryloxy group is preferable an aryloxy group having from 6 to 20 carbon atoms. Examples of the substituent include an alkoxy group and an ionic hydrophilic group.

Suitable examples of the aryloxy group include phenoxy, p-methoxyphenoxy, and o-methoxyphenoxy.

The acylamino group represented by $R^8$ includes a substituted acylamino group and an unsubstituted acylamino group.

As the acylamino group is preferable an acylamino group having from 2 to 20 carbon atoms. Examples of the substituent include an ionic hydrophilic group.

Suitable examples of the acylamino group include acetamide, propionamide, benzamide, and 3,5-disulfobenzamide.

The sulfonylamino group represented by $R^8$ includes a substituted sulfonylamino group and an unsubstituted sulfonylamino group.

As the sulfonylamino group is preferable a sulfonylamino group having from 1 to 20 carbon atoms.

Suitable examples of the sulfonylamino group include methylsulfonylamino and ethylsulfonylamino.

The alkoxycarbonylamio group represented by $R^8$ includes a substituted alkoxycarbonylamino group and an unsubstituted alkoxycarbonylamino group.

As the alkoxycarbonylamino group is preferable an alkoxycarbonylamino group having from 2 to 20 carbon atoms. Examples of the substituent include an ionic hydrophilic group.

Suitable examples of the alkoxycarbonylamino group include ethoxycarbonylamino.

The ureido group represented by $R^8$ includes a substituted ureido group and an unsubstituted ureido group.

As the ureido group is preferable a ureido group having from 1 to 20 carbon atoms.

Examples of the substituent include an alkyl group and an aryl group.

Suitable examples of the ureido group include 3-methylureido, 3,3-dimethylureido, and 3-phenylureido.

The alkoxycarbonyl group represented by $R^7$, $R^8$, and $R^9$ includes a substituted alkoxycarbonyl group and an unsubstituted alkoxycarbonyl group.

As the alkoxycarbonyl group is preferable an alkoxycarbonyl group having from 2 to 20 carbon atoms. Examples of the substituent include an ionic hydrophilic group.

Suitable examples of the alkoxycarbonyl include methoxycarbonyl and ethoxycarbonyl.

The carbamoyl group represented by $R^2$, $R^7$, $R^8$, and $R^9$ includes a substituted carbamoyl group and an unsubstituted carbamoyl group. Examples of the substituent include an alkyl group.

Suitable examples of the carbamoyl group include a methylcarbamoyl group and a dimethylcarbamoyl group.

The sulfamoyl group represented by $R^8$ includes a substituted sulfamoyl group and an unsubstituted sulfamoyl group. Examples of the substituent include an alkyl group.

Suitable examples of the sulfamoyl group include a dimethylsulfamoyl group and a di-(2-hydroxyethyl)sulfamoyl group.

Suitable examples of the sulfonyl group represented by $R^8$ include methanesulfonyl and phenylsulfonyl.

The acyl group represented by $R^2$ and $R^8$ includes a substituted acyl group and an unsubstituted acyl group. As the acyl group is preferable an acyl group having from 1 to 20 carbon atoms. Examples of the substituent include an ionic hydrophilic group.

Suitable examples of the acyl group include acetyl and benzoyl.

The amino group represented by $R^8$ includes a substituted amino group and an unsubstituted amino group. Examples of the substituent include an alkyl group, an aryl group, and a heterocyclic group.

Suitable examples of the amino group include methylamino, diethylamino, anilino, and 2-chloroanilino.

The heterocyclic group represented by $R^4$, $R^6$, and $R^{10}$ is the same as the optionally substituted heterocyclic group represented by B in the general formula (Y-I), and its preferred examples, more preferred examples and most preferred examples are also the same.

Examples of the substituent include an ionic hydrophilic group, an alkyl group having from 1 to 12 carbon atoms, an aryl group, an alkyl- or arylthio group, a halogen atom, a cyano group, a sulfamoyl group, an sulfonamino group, a carbamoyl group, and an acylamino group. Each of the alkyl group and the aryl group may further have a substituent.

In the general formula (Y-III), Za represents —N=, —NH—, or $C(R^{11})$=; Za and Zc each independently represents —N= or $C(R^{11})$=; $R^{11}$ represents a hydrogen atom or a non-metallic substituent. As the non-metallic substituent represented by $R^{11}$ are preferable a cyano group, a cycloalkyl group, an aralkyl group, an aryl group, an alkythio group, an arylthio group, and an ionic hydrophilic group. Each of the substituents is synonymous with each of the substituents represented by $R^1$, and preferred examples thereof are also the same. Examples of a skeleton (i.e., a basic structure) comprising two 5-membered rings, which is included in the general formula (Y-III), are given below.

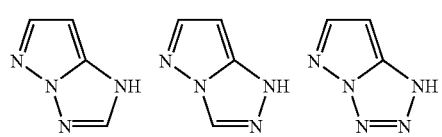

In the case where each of the foregoing substituents may further have a substituent, examples of the substituent include the substituents that may be substituted on the heterocyclic rings A and B of the general formula (Y-I).

Specific examples of the dye represented by the general formula (Y-I) (Y-101 to Y-160) will be given below, but it should not be construed that the present invention is limited thereto. These compounds can be synthesized by referring to JP-A-2-24191 and JP-A-2001-279145.

| Dye | R |
|---|---|
| Y-101 | $CON(C_2H_5)_2$ |
| Y-102 | $CON(C_4H_9)_2$ |
| Y-103 | $CON(C_6H_{13})_2$ |
| Y-104 | $COOC_4H_9$ |
| Y-105 | $COOC_6H_{13}$ |
| Y-106 | $COC_4H_9$ |
| Y-107 | $CONHC_4H_9$ |
| Y-108 | $CONHC_6H_{13}$ |

| Dye | R |
|---|---|
| Y-109 | $COOC_4H_9$ |
| Y-110 | $CONHC_4H_9$ |
| Y-111 | $CON(C_4H_9)_2$ |
| Y-112 | $SO_2NHC_6H_{13}$ |
| Y-113 | $SO_2N(C_4H_9)_2$ |
| Y-114 | $NHCOC_6H_{13}$ |
| Y-115 | $NHSO_2C_8H_{17}$ |
| Y-116 | $C_4H_9$ |
| Y-117 | $OC_6H_{13}$ |
| Y-118 | $COOC_{12}H_{25}$ |
| Y-119 | NHCOCHO—⌬—$C_5H_{11}(t)$, $C_2H_5$, $C_5H_{11}(t)$ |
| Y-120 | $NHSO_2$—⌬—$OC_{12}H_{25}$ |

-continued
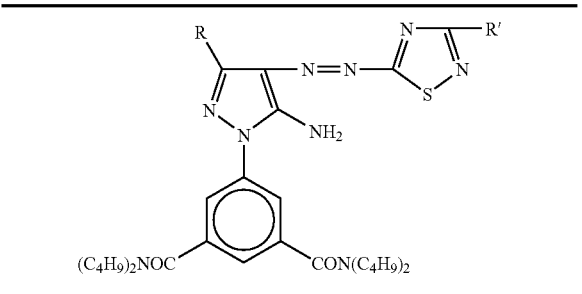
| Dye | R | R' |
|---|---|---|
| Y-121 | CH₃ | H |
| Y-122 | Ph | H |
| Y-123 | OC₂H₅ | H |
| Y-124 | C₄H₉(t) | SCH₃ |
| Y-125 | C₄H₉(t) | Ph |
| Y-126 | C₄H₉(t) | CH₃ |
| Y-127 | C₄H₉(t) | SC₈H₁₇ |
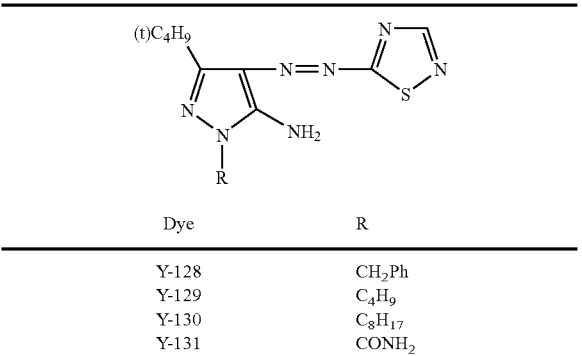
| Dye | R |
|---|---|
| Y-128 | CH₂Ph |
| Y-129 | C₄H₉ |
| Y-130 | C₈H₁₇ |
| Y-131 | CONH₂ |
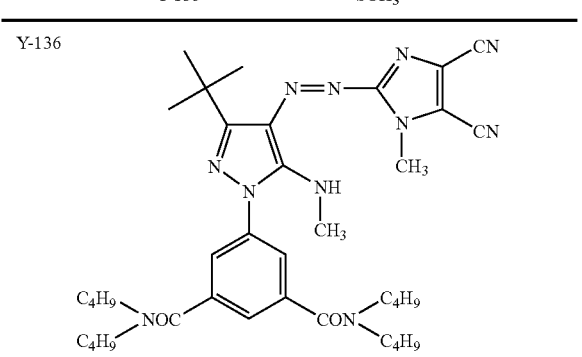
| Dye | R |
|---|---|
| Y-132 | H |
| Y-133 | CH₃ |
| Y-134 | Ph |
| Y-135 | SCH₃ |
Y-136
-continued
Y-137
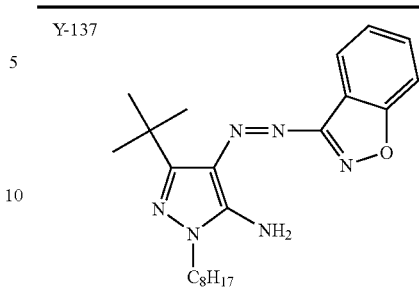
Y-138
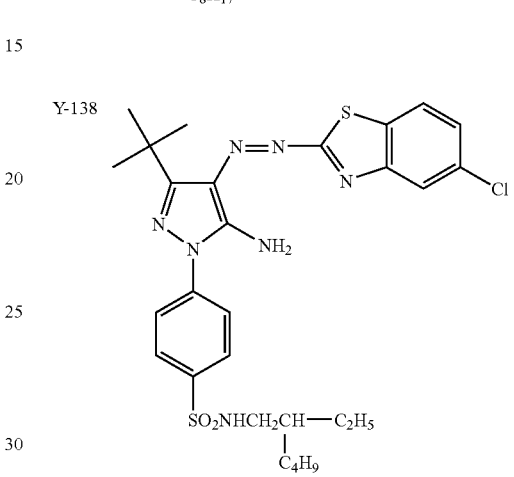
Y-139
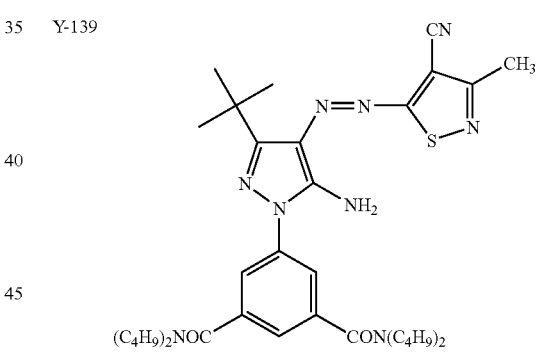
Y-140
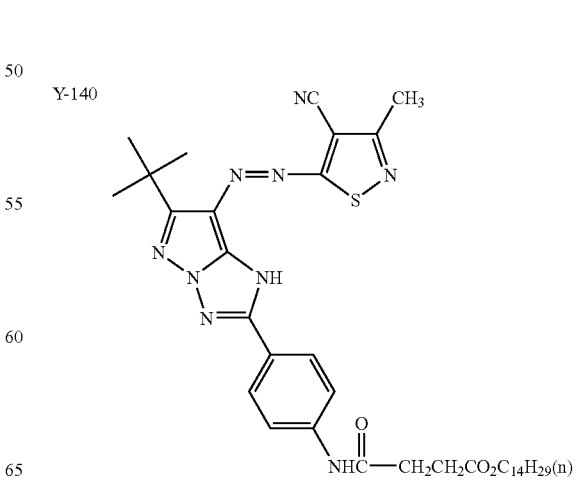

-continued
Y-141
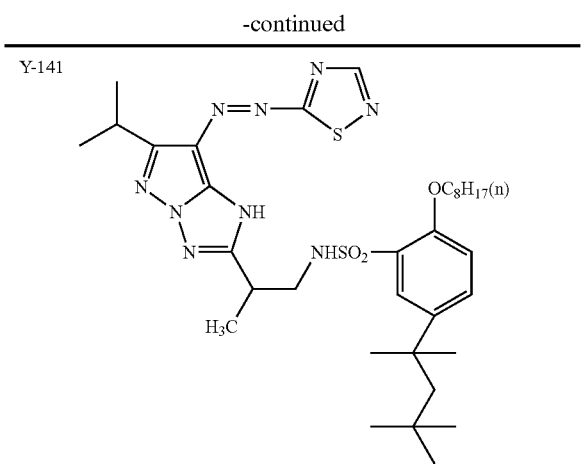
Y-142
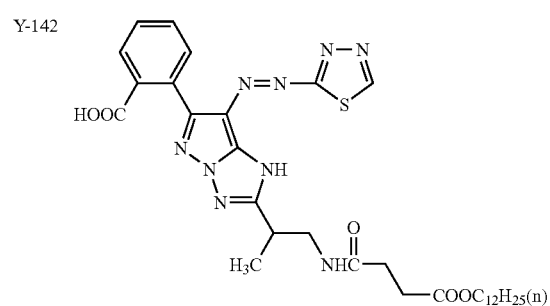
Y-143
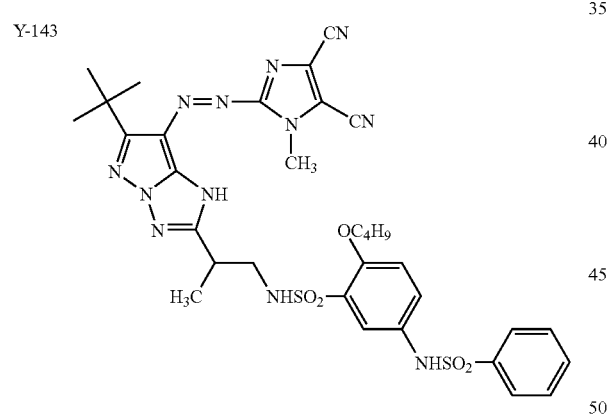
Y-144
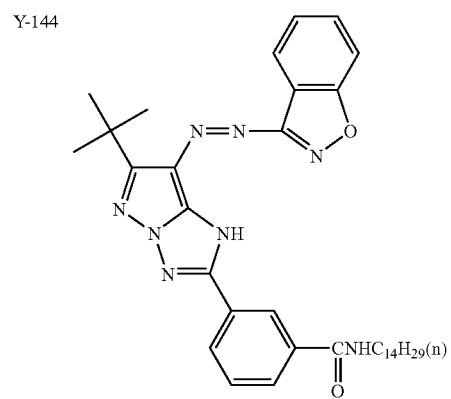
-continued
Y-145
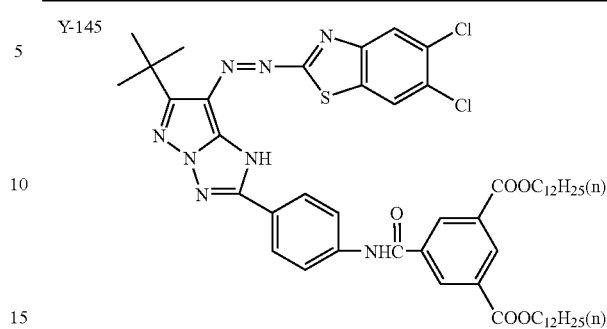
Y-146
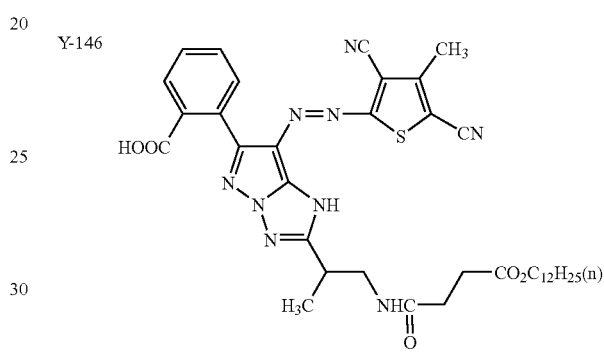
Y-147
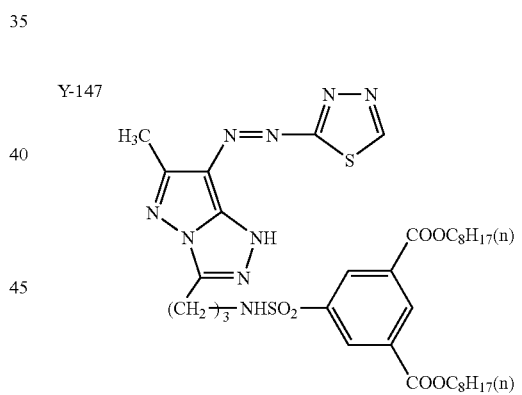
Y-148
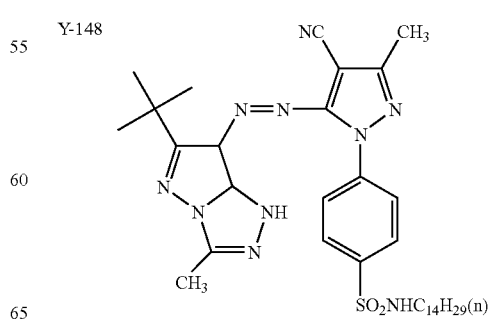

-continued
Y-149
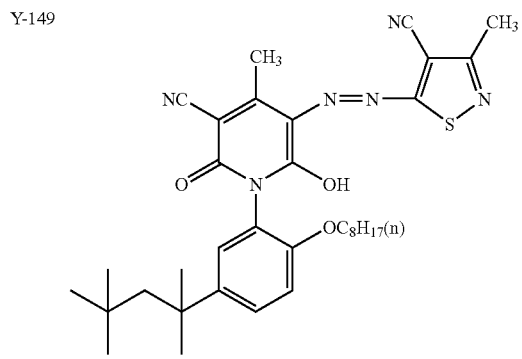
Y-150
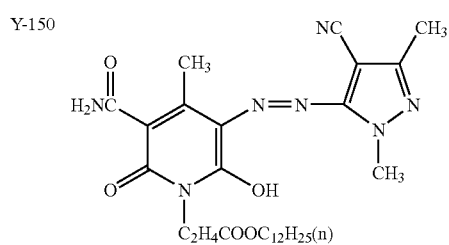
Y-151
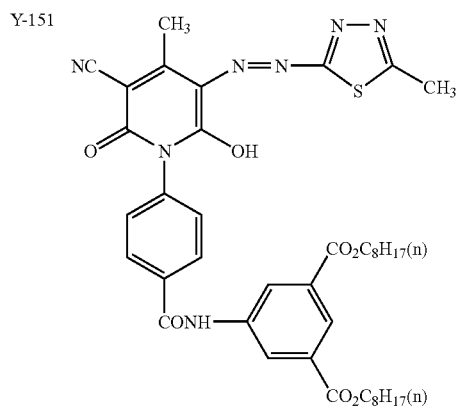
Y-152
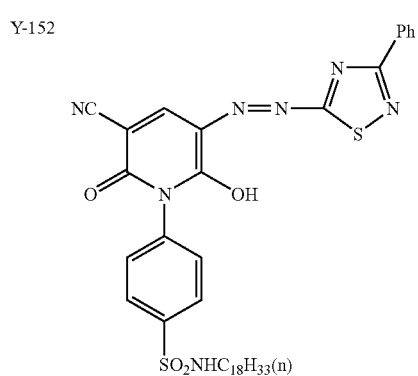
-continued
Y-153
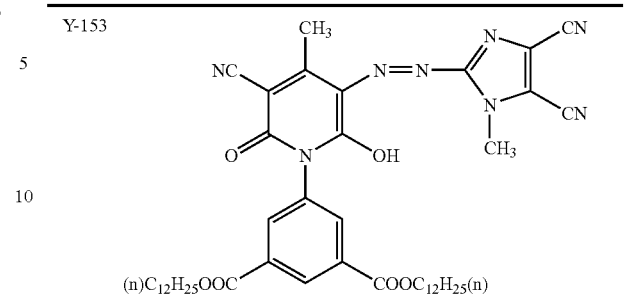
Y-154
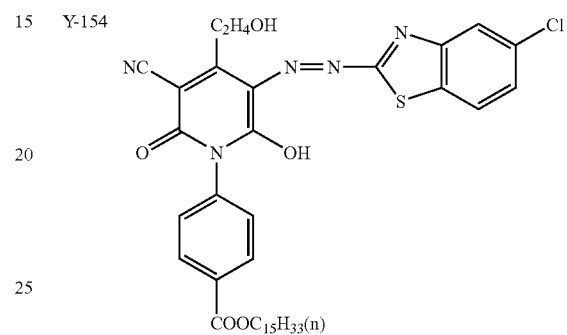
Y-155
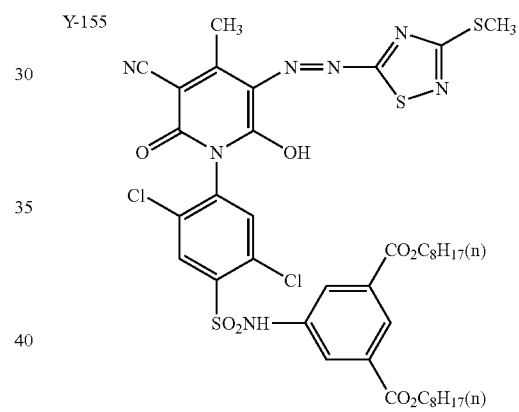
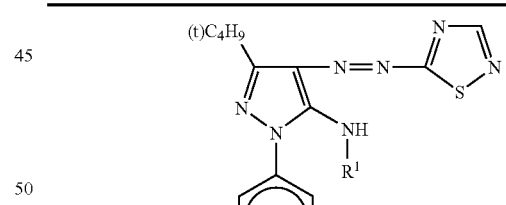
| Dye | R | R¹ |
|---|---|---|
| Y-156 | —$C_{16}H_{33}$ | $C_4H_9$ |
| Y-157 | —$C_{16}H_{33}$ | $C_2H_5$ |
| Y-158 | —$C_{14}H_{29}$ | H |
| Y-159 | —$C_{18}H_{37}$ | H |
| Y-160 | —$CH_2CH(C_2H_5)$—$C_4H_9$ | $CH_3$ |
While it is essential that the oil-soluble dye is dissolved in the monomer, it is also important that no crystal deposits with a lapse of time. In general, it is said to be better that a solubility parameter (hereinafter referred to as "SP value") of a monomer is closed to the SP value of an oil-soluble dye. However, since a portion relying on the structures of a molecule to be dissolved (the oil-soluble dye in the present invention) and a solvent (the monomer in the present invention) is present, there may be the case where interpretation cannot be made only in terms of the SP value. In the case of the oil-soluble dyes represented by the general formulae (Y-I), (Y-II), (Y-III), and (Y-IV), it has been found that the solubility and storage stability with time are made superior by using the two physical properties of the molar volume V value and the SP value.

The SP value is preferably from 26 to 21, more preferably from 25 to 21, further preferably from 24 to 21, and most preferably 24 to 22. The V value is preferably from 810 to 270, more preferably from 800 to 300, further preferably from 750 to 350, and most preferably from 700 to 380.

Here, the V value ($cm^3$/mole) and SP value ($J^{0.5}/cm^{1.5}$) are values calculated by the Fedors method. The calculation method is described in *Polym. Eng. Sci.*, Vol. 14, pp. 147 (1974).

Each of the foregoing dyes may be one in which a part of the chromophore is dissociated, thereby first undergoing color development into each color of yellow, magenta, or cyan. In that case, the counter cation may be an inorganic cation such as an alkali metal and ammonium, or an organic cation such as pyridinium and a quaternary ammonium salt, or may be a polymer cation having the foregoing cation in a partial structure thereof.

In order that the polymerization inhibiting or polymerization retarding action hardly occurs in the presence of air, the oil-soluble dye of the present invention is desired to have a high oxidation potential to reduce the reactivity with the polymerization initiator or oxygen radicals (such as oxy radical) as generated by the action of oxygen to monomer radicals (including growth radicals of oligomers and polymers). By increasing the oxidation potential, not only the curing properties of the ink are enhanced, but also ozone resistance is simultaneously enhanced because the reactivity with ozone as an electrophilic agent is lowered.

Desirably, the oil-soluble dye to be used in the present invention has an oxidation potential higher than 1.0 V (vs SCE) It is preferred that the oxidation potential is higher. The oxidation potential of the oil-soluble dye is preferably higher than 1.1 V (vs SCE), more preferably higher than 1.2 V (vs SCE), and most preferably higher than 1.3 V (vs SCE).

The measurement method of the value (Eox) of oxidation potential is described in, for example, Delahay, *New Instrumental Methods in Electrochemistry*, (1954), by Interscience Publishers; A. J. Bard, et al., *Electrochemical Methods*, (1980), by John Wiley & Sons; and Akira Fujishima, et al., *Denkikagaku Sokuteiho* (Electrochemical Measurement Methods), (1984), by Gihodo Shuppan.

Concretely, the oxidation potential is measured by dissolving a test sample ($1 \times 10^{-4}$ to $1 \times 10^{-6}$ mole/L) in a solvent (such as dimethylformamide and acetonitrile) containing a supporting electrolyte (such as sodium perchlorate and tetrapropylammonium perchlorate) and measuring a value: against SCE (saturated calomel electrode) by using cyclic voltammetry or direct current polarography. This value may deviate by about several tens millivolts by influences such as a liquid potential and a liquid resistance of the sample solution, but it is possible to guarantee the reproducivity of the potential by charging a standard sample (such as hydroquinone).

In the present invention, in order to univocally define the potential, a value (vs SCE) as measured in dimethylformamide containing 0.1 $moldm^{-3}$ of tetrapropylammonium perchlorate as a supporting electrolyte (dye contencentration: 0.001 $moldm^{-3}$) by direct current polarography is defined as the oxidation potential.

The Eox value stands for easiness of the movement of an electron from the sample to the electrode. The higher the value (the higher the oxidation potential), the more difficult the movement of the electron from the sample to the electrode, i.e., the sample is hardly oxidized. In accordance with the relationship with the structure of a compound, when an electron attractive group is introduced, the oxidation potential increases, whereas when an electron donating group is introduced, the oxidation potential decreases. Accordingly, when the Hammett's substituent constant, σp value as a measure of the electron attractive group or electron donating group is used, it can be said that by introducing. a substituent having a large σp value, such as a sulfinnyl group, a sulfonyl group, and a sulfamoyl group, the oxidation potential can be made higher.

A content of the oil-soluble dye in the ink is preferably from 0.05 to 15% by weight, more preferably from 0.1 to 10% by weight, and most preferably from 0.2 to 6% by weight.

<Storage Stabilizer>

The storage stabilizer controls undesirable polymerization during the preservation of the ink, and ones that can be dissolved in the ink are useful. As the storage stabilizer are enumerated quaternary ammonium salts, hydroxylamine salts, cyclic amides, nitrites, substituted ureas, heterocyclic compounds, organic acids, hydroquinone, hydroquinone monoethers, organic phosphines, and copper compounds, with hydroquinone and hydroquinone monoethers being preferred. Specific examples include benzyltrimethylammonium chloride, diethyl hydroxylamine, benzothiazole, 4-amino-2,2,6,6-tetramethylpyridine, citric acid, hydroquinone monomethyl ether, hydroquinone monobutyl ether, and copper napthenate.

Preferably, an amount of the storage stability to be used is properly regulated on a basis of the activity of the polymerization initiator as used, the polymerization properties of the monomer, and the kind of the storage stability. But, the amount of the storage stability to be used is preferably from 0.005 to 1% by weight, more preferably from 0.01 to 0.5% by weight, and most preferably from 0.01 to 0.2% by weight in the ink composition. When the addition amount of the storage stabilizer is too low, the storage stability is inferior, whereas when it is too high, there is a problem such that curing after the printing hardly occurs.

<Conductive Salt>

The conductive salt is a solid compound for enhancing the conductivity by dissolution in the ink. In the present invention, since there may be a high possibility that the conductive salt deposits during the preservation, it is preferred that the conductive salt is not substantially used. However, in the case where the solubility of the conductive salt is increased, or one having a high solubility in the liquid component of the ink is used so that the solubility is good, a proper amount of the conductive salt may be added. Examples of the conductive salt include potassium thiocyanate, lithium nitrate, ammonium thiocyanate, and dimethylamine hydrochloride.

<Other Components>

The ink composition according to the present invention may contain other components to be properly chosen depending on the purpose so far as the effects are not hindered. As other components are enumerated known additives such as solvents, polymers, surface tension adjustors, ultraviolet absorbers, antioxidants, anti-fading agents, and pH adjustors.

The solvent can be used for the purposes of regulating the polarity, viscosity and surface tension of the ink, enhancing the solubility of the oil-soluble dye, regulating the conductivity of the oil-soluble dye, and the regulating the printing performance.

As the solvent are enumerated water, low-boiling organic solvents, and high-boiling organic solvents.

A content of water is preferably 5% or less, more preferably 3% or less, and further preferably 0.5% or less. Most preferably, water is not substantially contained. Here, what water is not substantially contained means the case where water is contained as a component other than the major components in the material as used, namely, water is contained as an impurity, and water is not intentionally added. The case where the content of water is too high is not desired from the following reasons. That is, in the case where a non-water absorbing material to be recorded is used, the material is hardly dried, and the ink becomes non-uniform with time, or the ink is liable to cause precipitation or turbidity by deposition of the dye.

The low-boiling organic solvent is an organic solvent having a boiling point of 100° C. or lower. Taking into consideration the environmental pollution, it is desired that the low-boiling organic solvent be not used. In the case where it is used, it is preferred to use one having high safety. The solvent having high safety as referred to therein is a solvent having a managed concentration (an index expressed by the working environmental evaluation standards), and the managed concentration is preferably 100 ppm or higher, and more preferably 200 ppm or higher. As the low-boiling organic solvent are enumerated alcohols, ketones, esters, ethers, and hydrocarbons. Specific examples include methanol, 2-butanol, acetone, methyl ethyl ketone, ethyl acetate, and tetrahydrofuran.

The high-boiling organic solvent is an organic solvent having a boiling point higher than 100° C. The high-boiling organic solvent preferably has a boiling point of 150° C. or higher, and more preferably 170° C. or higher. As the high-boiling organic solvent are enumerated polyhydric alcohols, aliphatic carboxylic acid esters, phosphoric esters, and hydrocarbons. Specific examples include diethylene glycol, trimethylolpropane, dibutyl phthalate, 2-ethylhexyl benzoate, and alkylnaphthalenes. These solvents may be a liquid or a solid at normal temperature depending on the purpose.

The solvent may be used singly or in admixture of two or more thereof. An amount of the solvent to be use is preferably 20% by weight or less, more preferably 10% by weight or less, and most preferably 5% by weight or less. When the addition amount of the high-boiling organic solvent is too high, the drying properties are worsened, the resistance to rubbing of the image after curing is worsened, and the image after curing is liable to peel apart; and when the addition amount of the low-boiling organic solvent is too high, the printing properties are worsen due to evaporation of the solvent after long-term preservation, the generation of the organic solvent vapor adversely affects the health, and an ignition problem occurs. Therefore, these are not preferred.

The polymer can be used for regulating the polarity and viscosity of the ink, enhancing the solubility of the oil-soluble dye, and regulating the light fastness and adhesion of the ink after curing to a material to be recorded. While the polymer may be dissolved in the ink or may be a fine dispersion, it is preferred to dissolve the polymer in the ink from the standpoints of the storage stability and ejection properties of the ink.

In the case where the polymer is dissolved in the ink, ones having high affinity with the dye and the monomer are preferred. From the standpoint that an increase in viscosity of the ink hardly occurs, the polymer preferably has a molecular weight of 50,000 or less, more preferably of 20,000 or less, and most preferably 10,000 or less. As the polymer are enumerated vinyl polymers, polyurethanes, and polyesters. Specific examples include polybutyl acrylate, poly(isobutyl methacrylate-hydroxyethyl acrylate) (copolymerization weight ratio=95:5), poly(isopropyl acrylate-tetrahydrofurfuryl acrylate (copolymerization weight ratio=70: 30), poly(butyl methacrylate-N-methoxymethyl acrylamide) (copolymerization weight ratio=80:20), and polybutyl acrylate-polydimethylsiloxane block copolymer (copolymerization weight ratio=90:10).

In the case where the polymer is fine dispersion, it is essential that the polymer is not substantially dissolved in the monomer. Further, it is preferred that the polymer hardly swells or does not swell. The dispersion in the ink preferably has a particle size of 1 μm or less, more preferably 0.5 μm or less, and most preferably 0.1 μm or less. As the polymer are enumerated vinyl polymer fine particles, polyurethane fine particles, polyester fine particles, and urethane-vinyl composite particles. Specific examples include poly(acrylonitrile-ethyl acrylate-ethylene glycol dimethacrylate) (copolymerization weight ratio=60:37:3) and poly(styrene-butadiene) (copolymerization weight ratio=50:50).

The polymer may be used singly or in admixture of two or more thereof. An amount of the polymer to be used is preferably from 0 to 40% by weight, more preferably from 0 to 30% by weight, and most preferably from 0 to 20% by weight.

With respect to the surface tension adjustor, the ultraviolet absorber, the antioxidant, the anti-fading agent, and the pH adjustor, those as disclosed in JP-A-2001-181549 may be used.

While the physical properties of the ink reply on the printing device, the ink composition preferably has a viscosity of from 5 to 100 mPa·s, and more preferably from 10 to 80 mPa·s. Further, the ink composition preferably has a surface tension of from 20 to 60 mN/m, and more preferably from 30 to 50 mN/m.

(Image Recording Method)

In the image recording method according to the present invention, the image formation can be carried out using the ink composition by a known recording method. In particular, in the case where the image recording method is applied to the inkjet recording method, an ink nozzle to be used is not particularly limited but can be properly chosen according to the object.

In the ink composition according to the present invention can be suitably printed on a known material to be recorded. As the material to be recorded are enumerated plain papers, resin-coated papers, special inkjet papers, films, electrophotbgraphic shared papers, cloths, glass, metals, and ceramics. The materials to be recorded are described in, for example, JP-A-2001-181549.

The ink composition according to the present invention may be applied to any inkjet recording mode. As the inkjet recording mode are suitably employed a charge control mode for ejecting the ink utilizing an electrostatic induction force; a drop-on-demand mode (pressure pulse mode) utilizing an oscillation pressure of piezoelectric elements; an acoustic inkjet mode for converting electric signals into acoustic beams, irradiating the ink with the acoustic beams and ejecting the ink utilizing a radiation pressure; and a thermal inkjet (bubble jet) mode for heating the ink to form foams and utilizing a generated pressure. Among them are preferable a charge control mode, a pressure pulse mode, and an acoustic inkjet mode, with a charge control mode and a pressure pulse mode being particularly preferred.

The inkjet recording mode includes a mode for injecting many small-volume inks having a low concentration, called a photo-ink; a mode for using a plurality of inks having substantially the same hue and a different concentration to improve the image quality; and a mode for using a colorless transparent ink.

The curing method of the image varies depending on the kind of the radiations to be used. In the case of using ultraviolet rays or visible rays, a low-pressure mercury vapor lamp, a high-pressure mercury vapor lamp, a metal halide lamp, a carbon arc lamp, a xenon lamp, and a chemical lamp can be used. Of these are preferable a low-pressure mercury vapor lamp, a high-pressure mercury vapor lamp, and a metal halide lamp, with a high pressure mercury vapor lamp and a metal halide lamp being more preferred. In the case of using ultraviolet rays or visible rays, an irradiation energy is preferably from 1 to 1,000 mJ/cm$^2$, more preferably from 10 to 750 mJ/cm$^2$, further preferably from 10 to 500 MJ/cm$^2$, and most preferably from 10 to 250 mJ/cm$^2$. In the case where the irradiation energy is small, since the ink is hardly cured, or it is necessary to increase the sensitivity of the ink, the storage stability of the ink tends to become inferior. On the other hand, in the case where the irradiation energy is large, ozone or heat is generated, or a part of the dye may be possibly decomposed, and hence, such is not desired.

EXAMPLE

The present invention will be described below with reference to the Examples, but it should not be construed that the present invention is limited thereto. Incidentally, all "parts" and "%" are "parts by weight" and "weight %", respectively unless otherwise indicated.

Example 1

<Preparation of Ink 01>

To a mixture of 49 pats of pentaerythritol tetraacrylate, 25 parts of hexamethylene-1,6-diacrylate, and 15 parts of N-vinylformamide were added 2.5 parts of an oil-soluble dye (AII-17), 1.2 parts of a fluorine-based nonionic surfactant, 4 parts of bis(2,6-dimethoxybenzoyl)-2,4,4-trimethylpentylphosphine oxide, 1 part of 1-hydroxy-cyclohexyl phenyl ketone, 2.3 parts of triethanolamine, and 0.02 parts of hydroquinone monobutyl ether, and the mixture was dissolved. The solution was subjected to filtration by a 0.45-μm filter to prepare an inkjet recording ink.

<Preparation of Ink 02>

To a mixture of 39 parts of pentaerythritol tetraacrylate, 24 pats of dipentaerythritol tetraacrylate, 9 parts of ethylene glycol diacrylate, 5 parts of diethylaminoethyl acrylate, 7 parts of N-vinylformamide, 5 parts of pentaerythritol, and 15 parts of methyl ethyl ketone were added 2.5 parts of an oil-soluble dye (AII-17), 1.2 parts of a fluorine-based nonionic surfactant, 2 parts of bis(2,6-dimethoxybenzoyl)-2,4, 4-trimethylpentylphosphine oxide, 5 parts of 1-hydroxy-cyclohexyl phenyl ketone, and 0.02 parts of hydroquinone monobutyl ether, and the mixture was dissolved. The methyl ethyl ketone was distilled off under reduced pressure at 5° C., and the residue was subjected to filtration by a 0.45-μm filter to prepare an inkjet recording ink.

<Preparation of Ink 03>

To a mixture of 40 parts of ditrimethylolpropane tetraacrylate, 34 parts of pentaerythritol tetraacrylate, and 9 parts of tetrahydrofurfuryl acrylate were added 2.5 parts of an oil-soluble dye (AII-17), 5 parts of polybutyl methacrylate (number average molecular weight: 12,000), 1.2 parts of a fluorine-based nonionic surfactant, 3 parts of bis(2,6-dimethoxybenzoyl)-2,4,4-trimethylpentylphosphine oxide, 2 parts of 1-hydroxy-cyclohexyl phenyl ketone, 2 parts of diethanolamine, 1.3 parts of potassium thiocyanate, and 0.02 parts of hydroquinone monobutyl ether, and the mixture was dissolved. The solution was subjected to filtration by a 0.45-μm filter to prepare an inkjet recording ink.

<Preparation of Inks 04 to 09>

Each of inkjet recording inks of Inks 04 to 09 was prepared in the same manner as in the preparation of the Ink 02, except for changing the oil-soluble dye (AII-17) in the preparation of the Ink 02.

<Preparation of Inks 10 to 15>

Each of inkjet recording inks of Inks 10 to 15 was prepared in the same manner as in the preparation of the Ink 03, except for changing the addition amount of the hydroquinone monobutyl ether in the preparation of the Ink 03.

Using each of the thus prepared inkjet recording inks, an image was recorded on a PET film, which was then subjected to exposure with light at 200 mJ/cm$^2$ by a metal halide lamp.

The inks and the obtained recorded samples were evaluated in the following methods. The results obtained are shown in Table 1.

<Storage Stability>

The ink was preserved at 60° C. for 30 days, and then evaluated for the state and the filtration properties by a 0.45-μm filter.

The storage stability was evaluated in accordance with the following three grades.

A: The ink does not change, and the filtration properties by a 0.45-μm filter are good (good).

B: The ink does not change, but the filtration properties by a 0.45-μm filter are bad (allowable).

C: The ink gelates or is increased in viscosity (bad).

<Curing Properties>

The recorded image was observed and evaluated in accordance with the following three grades.

A: The ink is not sticky (good).

B: The ink is slightly sticky but does not stain a material to be contacted (allowable).

C: The ink is extremely sticky (bad).

<Color Tone>

The color tone was evaluated in accordance with the following three grades.

A: The best

B: Good

C: Bad

<Water Resistance>

The image-formed PET film was immersed in water for one minute and spontaneously dried at room temperature to observe blotting, peeling, and change in color tone.

The water resistance was evaluated in accordance with the following two grades.

A: Neither blotting nor peeling is observed, and the color tone does not change.

B: Any one of blotting, peeling, and change in color is observed.

<Light Fastness>

The image-formed PET film was irradiated with a xenon light (85,000 lx) using a weatherometer (Atlas C. 165) for 3 days, and the image density before and after the irradiation with a xenon light was measured using a reflection densitometer (X-Rite 310TR) and evaluated as a dye retention rate.

The light fastness was evaluated in accordance with the following three grades.

A: The dye retention rate is 80% or more.

B: The dye retention rate is less than 80% and 70% or more.

C: The dye retention rate is less than 70%.

TABLE 1

| No. | Oil-soluble dye | Storage stability | Curing properties | Color tone | Water resistant | Light fastness | Remarks |
| --- | --- | --- | --- | --- | --- | --- | --- |
| Ink 01 | AII-17 | A | A | A | A | A | Invention |
| Ink 02 | AII-17 | A | A | A | A | A | Invention |
| Ink 03 | AII-17 | A | A | A | A | A | Invention |
| Ink 04 | AII-19 | A | A | A | A | A | Invention |
| Ink 05 | AII-21 | A | A | A | A | A | Invention |
| Ink 06 | AII-3 | A | A | A | A | A | Invention |
| Ink 07 | AII-7 | A | A | A | A | A | Invention |
| Ink 08 | DD-1 | A | C | A | A | B | Comparison |
| Ink 09 | DD-2 | A | C | A | A | B | Comparison |

| No. | Storage stabilizer (weight %) | Storage stability | Curing properties | Color tone | Water resistant | Light fastness | Remarks |
| --- | --- | --- | --- | --- | --- | --- | --- |
| Ink 10 | 0 | C | A | A | A | A | Invention |
| Ink 11 | 0.005 | B | A | A | A | A | Invention |
| Ink 12 | 0.01 | A | A | A | A | A | Invention |
| Ink 13 | 0.04 | A | A | A | A | A | Invention |
| Ink 14 | 0.9 | A | B | A | A | A | Invention |
| Ink 15 | 1.1 | A | C | A | A | A | Invention |

DD-1

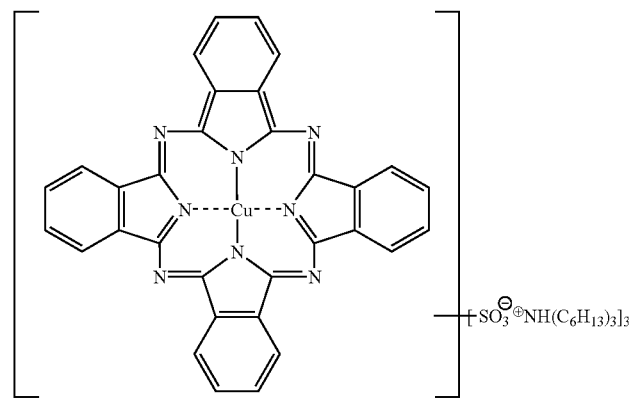

TABLE 1-continued

DD-2

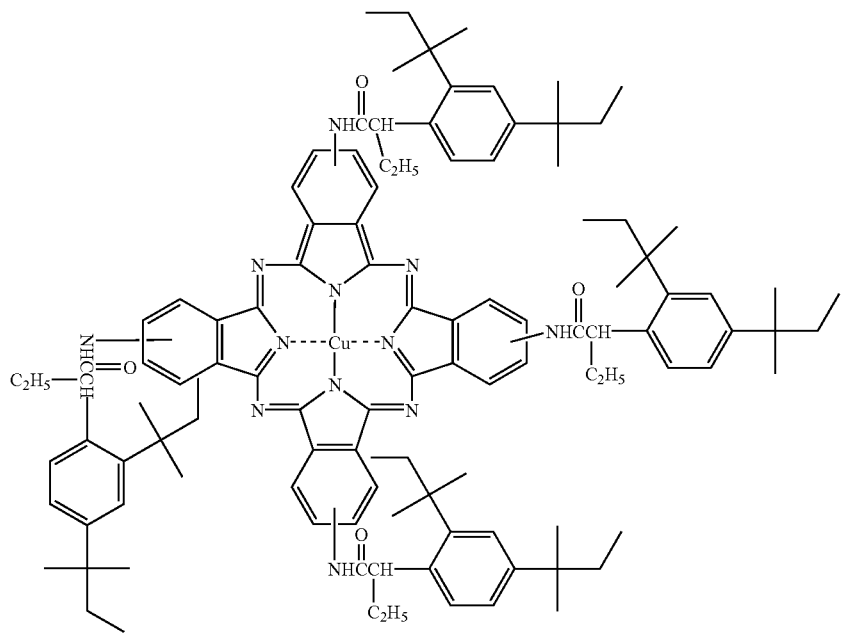

As is clear from Table 1, the Ink 10 not containing the storage stabilizer does not have storage stability; and the Ink 15 having a large quantity of the storage stabilizer is superior in the storage stability but is bad in the curing properties. The inkjet recording inks of the present invention were superior in the storage stability and curing properties, and when recorded on the PET having no liquid absorbing properties, exhibited superior properties in the color tone, water resistance and light fastness.

Example 2

Recording samples were prepared in the same manner as in Example 1, except that the image recording was carried out while changing the material to be recorded. The samples were evaluated in the same manner as in Example 1, except for the oxidation potential and ozone resistance.

<Ozone Resistance>

The ozone resistance was evaluated by measuring the image density before and after preserving the sample under a condition having an ozone concentration of 1.0 ppm for 5 days using a reflection densitometer (X-Rite 310) and determining the dye retention rate.

The evaluation was made in accordance with the following three grades: the case where the dye retention rate was 90% or more is designated as "A", the case where the dye retention rate was 70% or more but less than 90% is designated as "B", and the case where the dye retention rate was less than 70% is designated as "C", respectively.

<Oxidation Potential>

A definite amount (converted as molecular weight) of the dye was weighed and measured in N,N-dimethylformamide containing 0.1 moldm$^{-3}$ of tetrapropylammonium perchlorate (dye concentration: 0.001 moldm$^{-3}$) as a supporting electrolyte by direct current polarography, to determine a value of oxidation potential. In a polarography unit, a carbon (GC) electrode was used as a work electrode and a rotating platinum electrode was used as a counter electrode; an oxidation wave obtained by sweeping at the oxidation side was subjected to linear approximation; and a middle point between an intersection with its peak value and an intersection with the residual current value was defined as the value of oxidation potential (vs SCE). The measurement results of the phthalocyanine compounds used in the Examples and the comparative compounds were shown in Table 2.

TABLE 2

| No. | Ink No. | Material to be recorded | Oxidation potential | Curing properties | Color tone | Water resistance | Light fastness | Ozone resistance | Remarks |
|---|---|---|---|---|---|---|---|---|---|
| 1 | Ink 02 | Plain paper | 1.15 | A | A | A | A | A | Invention |
| 2 | Ink 05 | Plain paper | 1.27 | A | A | A | A | A | Invention |
| 3 | Ink 09 | Plain paper | 0.75 | C | A | A | B | A | Comparison |
| 4 | Ink 01 | Photo-glossy paper | 1.15 | A | A | A | A | A | Invention |
| 5 | Ink 05 | Photo-glossy paper | 1.27 | A | A | A | A | A | Invention |

TABLE 2-continued

| No. | Ink No. | Material to be recorded | Oxidation potential | Curing properties | Color tone | Water resistance | Light fastness | Ozone resistance | Remarks |
|---|---|---|---|---|---|---|---|---|---|
| 6 | Ink 09 | Photo-glossy paper | 0.75 | C | A | A | B | C | Comparison |
| 7 | Ink 01 | Aluminum sheet | 1.15 | A | A | A | A | A | Invention |
| 8 | Ink 05 | Aluminum sheet | 1.27 | A | A | A | A | A | Invention |
| 9 | Ink 09 | Aluminum sheet | 0.75 | C | A | A | B | B | Comparison |

As is apparent from the results shown in Table 2, the inks of the present invention could form good images on both of the conventional paper and the non-liquid absorbing material to be recorded and were superior in the curing properties, color tone, water resistance, light fastness, and ozone resistance. The oxidation potential of the dyes having good curing properties, light fastness and ozone resistance is higher than about 1.0.

Example 3

<Preparation of Ink 30>

To a mixture of 39 parts of pentaerythritol tetraacrylate, 35 parts of dipentaerythritol hexaacrylate, 9 parts of ethylene glycol diacrylate, 6 parts of diethylaminoethyl acrylate, and 15 parts of methyl ethyl ketone were added 3.0 parts of an oil-soluble dye (Y-156), 1.2 parts of fluorine-based nonionic surfactant, 2 parts of bis-(2,6-dimethoxybenzoyl)-2,4,4-trimethylpentylphosphine oxide, 5 parts of 1-hydroxy-cyclohexyl phenyl ketone, and 0.02 parts of hydroquinone monobutyl ether, and the mixture was dissolved. The methyl ethyl ketone was distilled off in vacuo at 5° C., and the residue was subjected to filtration by a 0.45-μm filter to prepare an inkjet recording ink.

<Preparation of Inks 31 to 36>

Each of inkjet recording inks of Inks 31 to 36 was prepared in the same manner as in the preparation of the Ink 30, except for changing the oil-soluble dye (Y-156) in the preparation of the Ink 30.

Recording samples were prepared in the same manner as in Example 1. The recording samples were evaluated for the curing properties, color tone, water resistance, and light fastness except for the stability in the same manner as in Example 1. Any of the recording samples exhibited rank "A" in the curing properties, color tone, water resistance, and light fastness except for the stability.

<Stability>

The ink was preserved at 25° C. for 7 days, and then evaluated for the state and the filtration properties by a 0.45-μm filter.

The storage stability was evaluated in accordance with the following three grades.

A: The ink does not change, and the filtration properties are good (good).

B: The ink is slightly turbid or slightly generates a precipitate (allowable).

C: The ink largely generates coagulation or gelates, or is increased in viscosity (bad).

TABLE 3

| Ink | Oil-soluble dye | V value | SP value | Stability | Remarks |
|---|---|---|---|---|---|
| Ink 30 | Y-156 | 804 | 20.9 | B | Invention: The SP value is smaller than the recommended value. |
| Ink 31 | Y-157 | 788 | 21.0 | A | Invention |
| Ink 32 | Y-158 | 688 | 21.6 | A | Invention |
| Ink 02 | Y-120 | 486 | 25.3 | A | Invention |
| Ink 33 | Y-101 | 350 | 26.5 | B | Invention: The SP value is larger than the recommended value. |

TABLE 4

| Ink | Oil-soluble dye | SP value | V value | Stability | Remarks |
|---|---|---|---|---|---|
| Ink 34 | Y-116 | 25.0 | 267 | B | Invention: The SP value is smaller than the recommended value. |
| Ink 35 | Y-117 | 24.4 | 303 | A | Invention |
| Ink 31 | Y-157 | 21.0 | 788 | A | Invention |
| Ink 36 | Y-159 | 21.0 | 817 | B | Invention: The SP value is larger than the recommended value. |

As is apparent from the results shown in Tables 3 and 4, the stability of the inks using the dye of the general formula (Y-I) is related to the solubility parameter SP value ($J^{0.5}/cm^{1.5}$) and the molar volume V value ($cm^3/mole$). In the case of the oil-soluble dyes having a preferred V value range of from 800 to 270 as shown in Table 3, the Ink 30 having an SP value smaller than 21 and the Ink 33 having an SP value larger than 26 tend to be inferior in the stability. In the case of the oil-soluble dyes having a preferred SP value range of from 26 to 21 as shown in Table 4, the Ink 34 having a V value smaller than 270 and the Ink 36 having a V value larger than 810 tend to be inferior in the stability. It can be understood that in the case where the solubility parameter SP; value is in the range of from 26 to 21, and the molar volume V value is in the range of from 810 to 270, the ink stability is particularly superior.

Example 4

The following ink sets of four colors were prepared, and a full-color image was recorded and evaluated in the same manner as in Example 1. As a result, the obtained image was superior in any of the curing properties, color tone, water resistance, and light resistance. All of the dyes as used had an oxidation potential of 1.1 V or more.

<Yellow Ink>
An inkjet recording yellow ink was prepared in the same manner as in the preparation of the Ink 30 in Example 3, except for using 3.0 parts of an oil-soluble dye (Y-120) in place of 3.0 parts f the oil-soluble dye (Y-156) in the preparation of the Ink 30.

<Magenta Ink>
An inkjet recording magenta ink was prepared in the same manner as in the preparation of the Ink 30 in Example 3, except for using 2.0 parts of an oil-soluble dye (M-1) in place of 3.0 parts f the oil-soluble dye (Y-156) in the preparation of the Ink 30.

<Cyan Ink>
An inkjet recording cyan ink was prepared in the same manner as in the preparation of the Ink 30 in Example 3, except for using 2.0 parts of an oil-soluble dye (AII-17) in place of 3.0 parts f the oil-soluble dye (Y-156) in the preparation of the Ink 30.

<Black Ink>
An inkjet recording black ink was prepared in the same manner as in the preparation of the Ink 30 in Example 3, except for using 1.6 parts of an oil-soluble dye (M-1), 2.6 parts of an oil-soluble dye (II-17), and 1.8 parts of an oil-soluble dye (Y-120) in place of 3.0 parts f the oil-soluble dye (Y-156) in the preparation of the Ink 30.

M-1

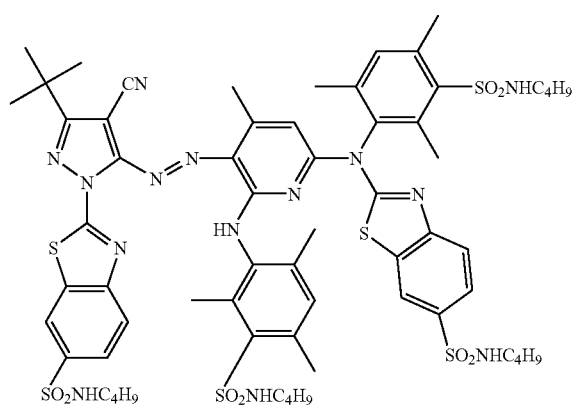

According to the present invention, it is possible to provide an ink composition that can form a high-quality image on not only liquid absorbing materials to be recorded but also non-liquid absorbing materials to be recorded, is superior in curing properties in air, and is superior in storage, stability, color tone, light fastness and water resistance of ink, and also to provide an image recording method.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:
1. A radiation-curable ink composition comprising a monomer having a polymerizable group selected from the group consisting of an acryloyl group, a methacryloyl group, an allyl group, and a vinyl group, an oil-soluble dye, and from 0.005 to 1% by weight of a storage stabilizer, wherein the oil-soluble dye is dissolved in the ink, wherein the oil-soluble dye has an oxidation potential that is higher than 1.0 V against SCE, and wherein the oil-soluble dye is at least one member selected from dyes represented by the following general formula (I–1):

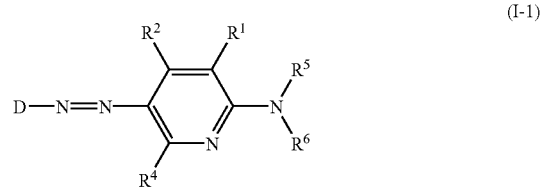

wherein D-N= represents an atomic group necessary such that the compound represented by the general formula (I–1) absorbs light in a visible region and/or in a near infrared region, and D represents a five-membered heterocyclic group represented by the following general formulae (a), (b), (c), (d) or (f);

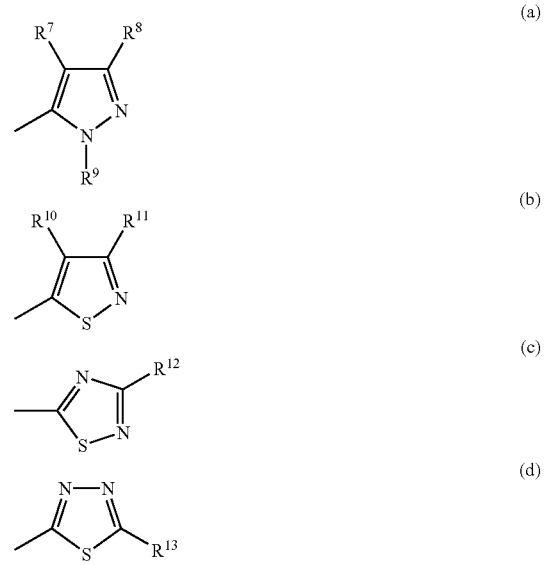

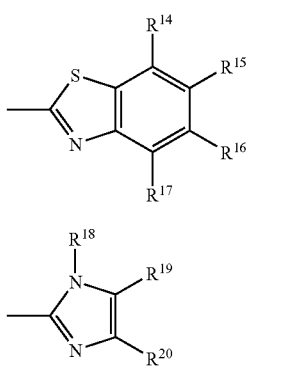

wherein $R^5$ and $R^6$ each independently represents a hydrogen atom, an alkyl group, an aryl group or a heterocyclic group; $R^1$, $R^2$, $R^4$, $R^7$ to $R^{13}$, and $R^{18}$ to $R^{20}$ each independently represents a hydrogen atom or a substituent group; and $R^1$ and $R^2$, $R^1$ and $R^5$, and $R^5$, and $R^6$ may optionally form a ring by combining with each other; and dyes represented by the following general formula (A-I):

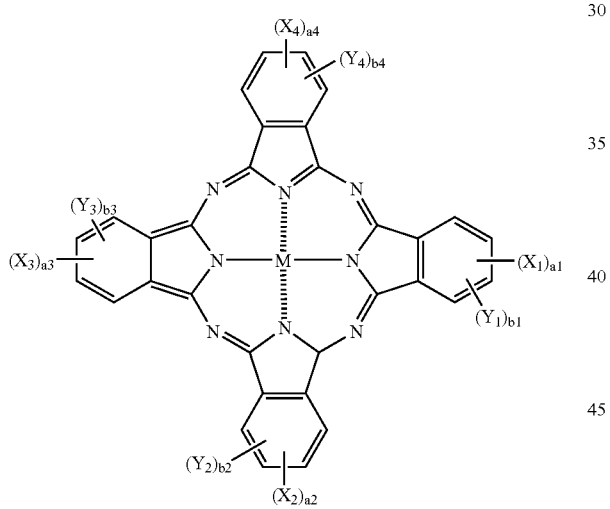

wherein $X_1$, $X_2$, $X_3$, and $X_4$ each independently represents a group selected from —SO-Z, —SO$_2$-Z, —SO$_2$NR$_1$R$_2$, —CONR$_1$R$_2$, —CO$_2$R$_1$, and a sulfo group; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that $R_1$ and $R_2$ do not represent a hydrogen atom at the same time; M represents a hydrogen atom, a metal element, a metal oxide, a metal hydroxide, or a metal halide; $Y_1$, $Y_2$, $Y_3$, and $Y_4$ each independently represents a hydrogen atom or a monovalent substituent; and $a_1$ to $a_4$ and $b_1$ to $b_4$ represent the numbers of $X_1$ to $X_4$ and $Y_1$ to $Y_4$, respectively and each independently represents an integer of from 0 to 4, provided that the total sum of $a_1$ to $a_4$ is 2 or more and 16 or less.

2. The radiation-curable ink composition as in claim 1, further comprising a photopolymerization initiator.

3. The radiation-curable ink composition as in claim 1, which does not substantially contain water or conductive salts.

4. The radiation-curable ink composition as in claim 1, wherein a content of a dispersion medium other than the monomer, or a solvent is 20% by weight or less.

5. The radiation-curable ink composition as in claim 1, wherein the oil-soluble dye is at least one member selected from cyan dyes, magenta dyes, yellow dyes, and black dyes.

6. An ink set of a radiation-curable ink composition comprising a magenta ink containing a dye represented by the general formula (I–1), and a cyan ink containing a dye represented by the general formula (A-I), wherein the radiation-curable ink composition comprises a monomer having a polymerizable group selected from the group consisting of an acryloyl group, a methacryloyl group, an allyl group, and a vinyl group, an oil-soluble dye, and from 0.005 to 1% by weight of a storage stabilizer, wherein the oil-soluble dye is dissolved in the ink, wherein the general formula (I–1) is represented by

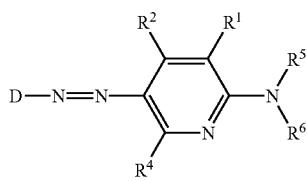

wherein D-N= represents an atomic group necessary such that the compound represented by the general formula (I–1) absorbs light in a visible region and/or in a near infrared region, and D represents a five-membered heterocyclic group represented by the following general formulae (a), (b), (c), (d) or (f);

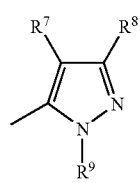

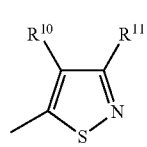

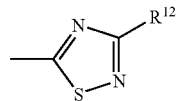

-continued

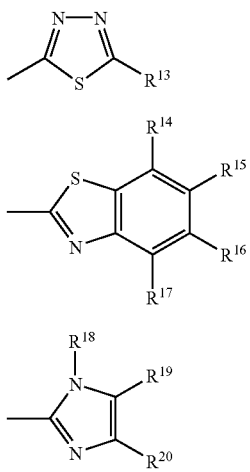

wherein $R^5$ and $R^6$ each independently represents a hydrogen atom, an alkyl group, an aryl group or a heterocyclic group; $R^1$, $R^2$, $R^4$, $R^7$ to $R^{13}$, and $R^{18}$ to $R^{20}$ each independently represents a hydrogen atom or a substituent group; and $R^1$ and $R^2$, $R^1$ and $R^5$, and $R^5$ and $R^6$ may optionally form a ring by combining with each other; and wherein the general formula (A-I) is represented by

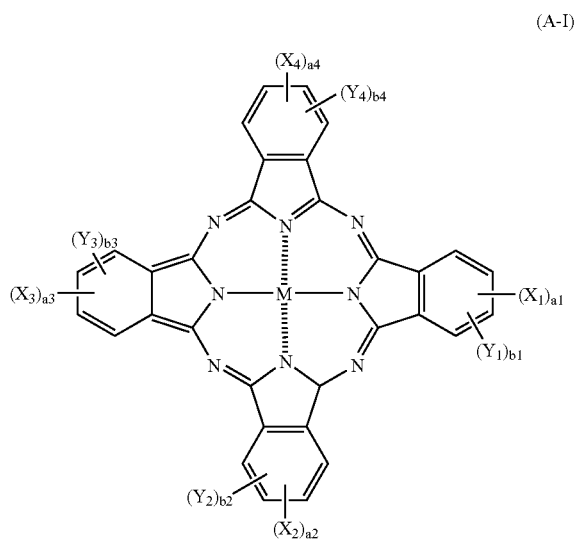

wherein $X_1$, $X_2$, $X_3$, and $X_4$ each independently represents a group selected from —SO-Z, —SO$_2$-Z, —SO$_2$NR$_1$R$_2$, —CONR$_1$R$_2$, —CO$_2$R$_1$, and a sulfo group; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that $R_1$ and $R_2$ do not represent a hydrogen atom at the same time; M represents a hydrogen atom, a metal element, a metal oxide, a metal hydroxide, or a metal halide; $Y_1$, $Y_2$, $Y_3$, and $Y_4$ each independently represents a hydrogen atom or a monovalent substituent; and $a_1$ to $a_4$ and $b_1$ to $b_4$ represent the numbers of $X_1$ to $X_4$ and $Y_1$ to $Y_4$, respectively and each independently represents an integer of from 0 to 4, provided that the total sum of $a_1$ to $a_4$ is 2 or more and 16 or less.

7. An image recording method comprising undergoing recording using the radiation-curable ink composition as in claim 1 and then irradiating with a radiation to achieve curing.

8. The image recording method as in claim 7, wherein the recording is achieved by any one inkjet mode of charge control mode, pressure pulse mode, and acoustic inkjet mode and then irradiating with a radiation to achieve curing.

9. A radiation-curable ink composition comprising a monomer having a polymerizable group selected from the group consisting of an acryloyl group, a methacryloyl group, an allyl group, and a vinyl group, an oil-soluble dye, and from 0.005 to 1% by weight of a storage stabilizer, wherein the oil-soluble dye is dissolved in the ink, wherein the oil-soluble dye is at least one member selected from dyes represented by the following general formula (I–1):

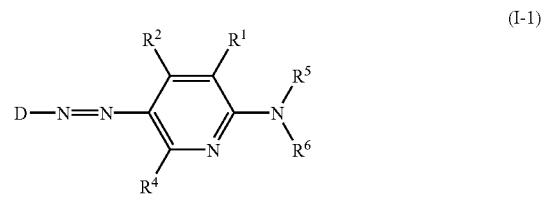

wherein D-N= represents an atomic group necessary such that the compound represented by the general formula (I–1) absorbs light in a visible region and/or in a near infrared region, and D represents a five-membered heterocyclic group represented by the following general formulae (a), (b), (c), (d) or (f);

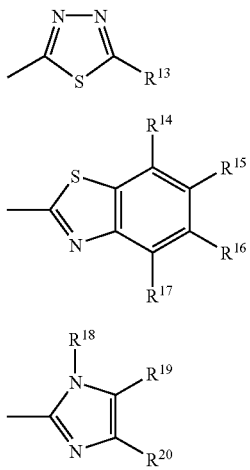

wherein $R^5$ and $R^6$ each independently represents a hydrogen atom, an alkyl group, an aryl group or a heterocyclic group; $R^1$, $R^2$, $R^4$, $R^7$ to $R^{13}$, and $R^{18}$ to $R^{20}$ each independently represents a hydrogen atom or a substituent group; and $R^1$ and $R^2$, $R^1$ and $R^5$, and $R^5$ and $R^6$ may optionally form a ring by combining with each other; and dyes represented by the following general formula (A-I):

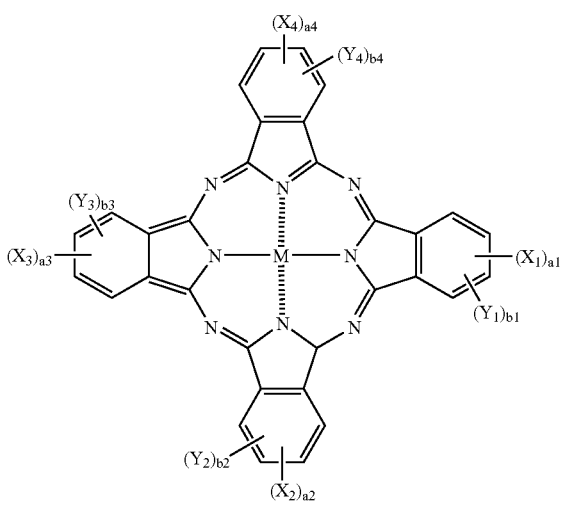

wherein $X_1$, $X_2$, $X_3$, and $X_4$ each independently represents a group selected from —SO-Z, —SO$_2$-Z, —SO$_2$NR$_1$R$_2$, —CONR$_1$R$_2$, —CO$_2$R$_2$, and a sulfo group; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that $R_1$ and $R_2$ do not represent a hydrogen atom at the same time; M represents a hydrogen atom, a metal element, a metal oxide, a metal hydroxide, or a metal halide; $Y_1$, $Y_2$, $Y_3$, and $Y_4$ each independently represents a hydrogen atom or a monovalent substituent; and $a_1$ to $a_4$ and $b_1$ to $b_4$ represent the numbers of $X_1$ to $X_4$ and $Y_1$ to $Y_4$, respectively and each independently represents an integer of from 0 to 4, provided that the total sum of $a_1$ to $a_4$ is 2 or more and 16 or less.

10. The radiation-curable ink composition as in claim 9, further comprising a photopolymerization initiator.

11. The radiation-curable ink composition as in claim 9, which does not substantially contain water or conductive salts.

12. The radiation-curable ink composition as in claim 9, wherein a content of a dispersion medium other than the monomer, or a solvent is 20% by weight or less.

13. The radiation-curable ink composition as in claim 9, wherein the oil-soluble dye is at least one member selected from cyan dyes, magenta dyes, yellow dyes, and black dyes.

14. An ink set of the radiation-curable ink composition as in claim 9, comprising of a magenta ink containing the dye represented by the general formula (I–1), and a cyan ink containing the dye represented by the general formula (A-I).

15. An image recording method comprising undergoing recording using the radiation-curable ink composition as in claim 9 and then irradiating with a radiation to achieve curing.

16. The image recording method as in claim 15, wherein the recording is achieved by any one inkjet mode of charge control mode, pressure pulse mode, and acoustic inkjet mode and then irradiating with a radiation to achieve curing.

17. The radiation-curable ink composition as in claim 9, wherein the dyes represented by the general formula (A-I) are represented by the general formula (A-II):

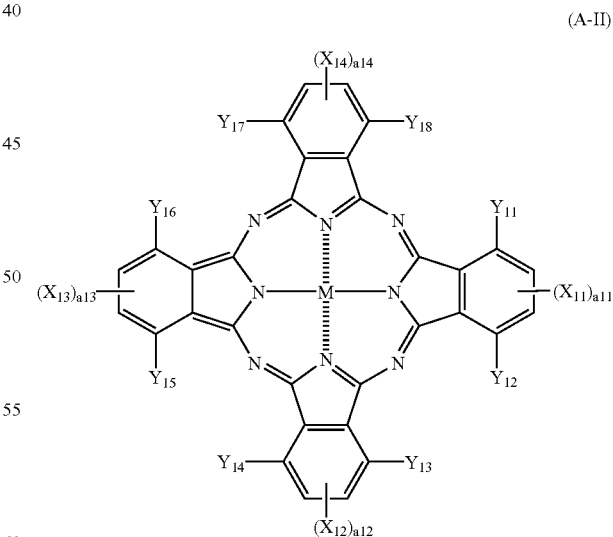

wherein $X_{11}$, $X_{12}$, $X_{13}$, and $X_{14}$ each independently represents a group selected from —SO-Z, —SO$_2$-Z, —SO$_2$NR$_1$R$_2$, —CONR$_1$R$_2$, —CO$_2$R$_1$, and a sulfo group; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that $R_1$ and $R_2$ do not represent a hydrogen atom at the same time; M represents a hydrogen atom, a metal element, a metal oxide, a metal hydroxide, or a metal halide; $Y_{11}$, $Y_{12}$, $Y_{13}$, $Y_{14}$, $Y_{15}$, $Y_{16}$, $Y_{17}$ and $Y_{18}$ each independently represents a hydrogen atom or a monovalent substituent; and $a_{11}$ to $a_{14}$ each independently represents an integer of 1 or 2.

18. The radiation-curable ink composition as in claim 17, wherein $a_{11}$ to $a_{14}$ fulfill the following relationship: $4 \leq (a_{11}+a_{12}+a_{13}+a_{14}) \leq 6$.

19. The radiation-curable ink composition as in claim 17, wherein $a_{11}=a_{12}=a_{13}=a_{14}=1$.

* * * * *